(12) United States Patent
Nishimura et al.

(10) Patent No.: US 9,255,517 B2
(45) Date of Patent: Feb. 9, 2016

(54) ENGINE DEVICE

(71) Applicant: YANMAR CO., LTD., Osaka (JP)

(72) Inventors: Shinji Nishimura, Osaka (JP); Satoshi Nakano, Osaka (JP); Takayuki Onodera, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/427,840

(22) PCT Filed: Sep. 13, 2013

(86) PCT No.: PCT/JP2013/074915
§ 371 (c)(1),
(2) Date: Mar. 12, 2015

(87) PCT Pub. No.: WO2014/042254
PCT Pub. Date: Mar. 20, 2014

(65) Prior Publication Data
US 2015/0240698 A1 Aug. 27, 2015

(30) Foreign Application Priority Data

Sep. 14, 2012 (JP) ................................. 2012-202654

(51) Int. Cl.
*F01N 13/08* (2010.01)
*F01N 13/18* (2010.01)
(Continued)

(52) U.S. Cl.
CPC ........... *F01N 13/1805* (2013.01); *F01M 11/00* (2013.01); *F01M 11/0004* (2013.01); *F01N 13/002* (2013.01); *F01N 13/10* (2013.01); *F02F 7/00* (2013.01); *F02M 25/0703* (2013.01); *F02M 25/0747* (2013.01); *F02M 35/10209* (2013.01); *F02M 37/0011* (2013.01);
(Continued)

(58) Field of Classification Search
CPC . F01N 13/08; F01N 13/1805; F01N 2340/04; B60K 13/04
USPC ............ 60/278, 299, 322; 123/195 R, 195 A, 123/195 C
See application file for complete search history.

(56) References Cited

U.S. PATENT DOCUMENTS

| 5,730,632 A | * | 3/1998 | Murata | ...................... F01N 3/28 440/88 R |
| 2007/0107419 A1 | * | 5/2007 | Taniguchi | ............... F01N 1/084 60/299 |

(Continued)

FOREIGN PATENT DOCUMENTS

| JP | 53-59016 | 10/1976 |
| JP | 7-172392 | 7/1995 |

(Continued)

*Primary Examiner* — Thomas Denion
*Assistant Examiner* — Jorge Leon, Jr.
(74) *Attorney, Agent, or Firm* — Jordan and Hamburg LLP

(57) ABSTRACT

An engine device in which an exhaust gas purification device can be assembled adjacent to an engine with high rigidity, and the exhaust gas purification device can be compactly installed. The engine device includes an exhaust gas recirculation device and a common rail disposed on the side on which an intake manifold of the engine is disposed, the exhaust gas purification device disposed on the side on which an exhaust manifold of the engine is disposed, an oil pan disposed on the bottom of the engine, and a support body for linking the exhaust gas purification device to the oil pan, so that the exhaust gas purification device is supported by the oil pan via the support body.

3 Claims, 26 Drawing Sheets

(51) Int. Cl.
*F02F 7/00* (2006.01)
*F01M 11/00* (2006.01)
*F01N 13/00* (2010.01)
*F01N 13/10* (2010.01)
*F02M 35/10* (2006.01)
*F02M 37/00* (2006.01)
*B60K 13/04* (2006.01)
*F02B 67/00* (2006.01)
*F02M 25/07* (2006.01)

(52) U.S. Cl.
CPC ....... *B60K 13/04* (2013.01); *F01M 2011/0029* (2013.01); *F01M 2011/0054* (2013.01); *F01N 13/08* (2013.01); *F01N 2340/02* (2013.01); *F01N 2340/04* (2013.01); *F02B 67/00* (2013.01); *F02M 25/0724* (2013.01); *F02M 25/0731* (2013.01)

(56) References Cited

U.S. PATENT DOCUMENTS

2008/0236152 A1* 10/2008 Morita ............... F01N 3/10 60/324
2011/0154810 A1* 6/2011 Mitsuda ............... E02F 9/00 60/311

FOREIGN PATENT DOCUMENTS

| | | |
|---|---|---|
| JP | 2003-027922 | 1/2003 |
| JP | 2004-150292 | 5/2004 |
| JP | 2008-008516 | 1/2008 |
| JP | 2009-108685 | 5/2009 |
| JP | 2010-071180 | 4/2010 |
| JP | 2011-043078 | 3/2011 |
| JP | 2011-121522 | 6/2011 |
| JP | 2011-231754 | 11/2011 |

* cited by examiner

ENGINE DEVICE

TECHNICAL FIELD

The present invention relates to an engine device mounted in a cargo transportation container or the like. More specifically, the present invention is applied to an engine mounted in a cargo transportation container or various vehicles, for example, and relates to an engine device for driving an air conditioning unit for freezing or refrigeration, a temperature conditioner for vehicle, an electric generator, or the like.

BACKGROUND OF THE INVENTION

Conventionally, there is known a technique in which a diesel particulate filter (oxidation catalyst, honeycomb filter) is disposed in an exhaust gas path of a diesel engine as an exhaust gas purification device (post-processing device), so as to purify exhaust gas from the diesel engine by the diesel particulate filter (see Patent Document 1). In addition, there is a technique in which an exhaust gas purification device is mounted on a vehicle body frame with a diesel engine (see Patent Document 2, Patent Document 3, and Patent Document 4). Further, there is also a technique in which a freezing air conditioning unit and an engine for driving the air conditioning unit are mounted in a container for transporting frozen cargo or the like, inside temperature of the container is maintained at a temperature necessary for freezing preservation of the cargo (for example, −20° C.) or lower, and the container is linked to a tractor, so as to transport the cargo in frozen preserved state (Patent Document 5).

PRIOR ART DOCUMENTS

Patent Documents

Patent Document 1: JP-A-2003-27922
Patent Document 2: JP-A-2009-108685
Patent Document 3: JP-A-2011-43078
Patent Document 4: JP-A-2011-121522
Patent Document 5: JP-A-2008-8516

The structure of Patent Documents 2 to 4, in which the exhaust gas purification device (Patent Document 1) is mounted in the vehicle body frame, is aimed at complying with regulation of exhaust gas in the state where the diesel engine is mounted in the vehicle body.

However, in recent years, it is required to clear the regulation of exhaust gas and to assure quality thereof as a single unit of the diesel engine before being mounted in the vehicle body. Further, the diesel engine has a wide versatility and is used in various fields, such as an agricultural machine, a construction machine, and electric generator, a ship, a cargo transportation container.

Therefore, an engine manufacturer who supplies a versatile diesel engine is required to configure the exhaust gas purification device as a post-processing device to be supported by the single unit of the diesel engine itself so as to clear the regulation of exhaust gas and to assure quality thereof.

However, a mounting space of the diesel engine varies depending on a mounted machine, but in many cases, the mounting space of the diesel engine is restricted by requirements of lighter weight and smaller size. It is a technical task to dispose and support the exhaust gas purification device in the restricted mounting space of the single unit of the diesel engine.

For instance, in the conventional technique of Patent Document 5, in which the diesel engine as a drive source of the air conditioning unit or the like is mounted in the cargo transportation container, the diesel particulate filter can be disposed on an upper part of the diesel engine, but the mounting space of the diesel engine cannot be easily reduced. In addition, because outer dimensions of the cargo transportation container are determined for each intended use and cannot be increased, there is a problem that a space volume of the container for cargo must be reduced.

In addition, when keeping the cargo transportation container in its working state for long period, or when moving the container in its working state for long distance, the engine is continuously operated for long period in rotating state at relatively low speed. Therefore, there is also a problem that exhaust gas purifying temperature of the exhaust gas purification device cannot be easily maintained at a temperature at which the exhaust gas can be continuously purified or higher.

Further, when operating the engine for long period, a large capacity of oil pan is necessary. Considering cost of molding the oil pan, there is also a problem that rigidity is not sufficient or that vibration of the engine is easily transmitted.

Therefore, it is an object of the present invention to provide an engine device with improvement after studying the present status.

SUMMARY OF THE INVENTION

In order to achieve the above-mentioned object, an engine device of the invention includes an exhaust gas recirculation device and a common rail, which are disposed on a side on which an intake manifold of an engine is disposed, an exhaust gas purification device disposed on a side on which an exhaust manifold of the engine is disposed, an oil pan disposed on a bottom of the engine, and a support body for linking the exhaust gas purification device to the oil pan, so that the exhaust gas purification device is supported by the oil pan via the support body.

The invention has a structure in the engine device in which the oil pan is configured to be divided into an upper oil pan and lower oil pan, a support body attaching portion is formed on a side face of the upper oil pan protruding outward from a side face of a cylinder block among side faces of the engine, and the support body is detachably fastened to the support body attaching portion.

The invention has a structure in the engine device in which a fuel filter is disposed on a machine frame side on which the engine is installed, and the fuel filter is connected to a fuel pump of the engine.

The invention has a structure in the engine device in which the exhaust gas purification device is disposed to face a side face on which an engine leg mounting portion is formed among side faces of the cylinder block.

According to the invention, the engine device includes the exhaust gas recirculation device and the common rail disposed on the side on which the intake manifold of the engine is disposed, the exhaust gas purification device disposed on the side on which the exhaust manifold of the engine is disposed, the oil pan disposed on the bottom of the engine, and the support body for linking the exhaust gas purification device to the oil pan, so that the exhaust gas purification device is supported by the oil pan via the support body. Therefore, the oil pan made by casting process, for example, to have high rigidity is utilized for assembling the exhaust gas purification device to be near the engine with high rigidity. In addition, the exhaust gas purification device can be compactly disposed without substantially increasing mounting width dimensions (height, right and left width, front and rear width) of the engine. In other words, for example, the engine can be compactly mounted in a freezing shipping container or the like.

According to the invention, the oil pan is configured to be divided into an upper oil pan and lower oil pan, a support body attaching portion is formed on a side face of the upper oil pan protruding outward from a side face of a cylinder block among side faces of the engine, and the support body is detachably fastened to the support body attaching portion. Therefore, a side portion of the oil pan is protruded from the side of the engine bottom so that the mounting space for the exhaust gas purification device can be secured. Thus, the oil pan having large capacity is utilized so that a support structure for the exhaust gas purification device can be simplified, and simultaneously, support rigidity of the exhaust gas purification device can be sufficiently secured.

According to the invention, a fuel filter is disposed on the machine frame side on which the engine is installed, and the fuel filter is connected to a fuel pump of the engine. Therefore, the fuel filter can be assembled in a place facilitating maintenance work, and restrictions such as the mounting width dimensions (height, right and left width, front and rear width) of the engine can be reduced so that the engine can be compactly mounted in various machines.

According to the invention, the exhaust gas purification device is disposed to face a side face on which an engine leg mounting portion is formed among side faces of the cylinder block. Therefore, the exhaust gas purification device can be supported adjacent to the engine leg fastened to the engine leg mounting portion. For instance, compared with a structure in which the exhaust gas purification device is supported away from the engine leg, shaking and vibration of the exhaust gas purification device due to vibration of the engine can be suppressed so that withstand load of the engine leg necessary for supporting the exhaust gas purification device can be reduced. Thus, antivibration mounting structure of the engine can be simplified.

DESCRIPTION OF THE PREFERRED EMBODIMENTS

Figure 1:
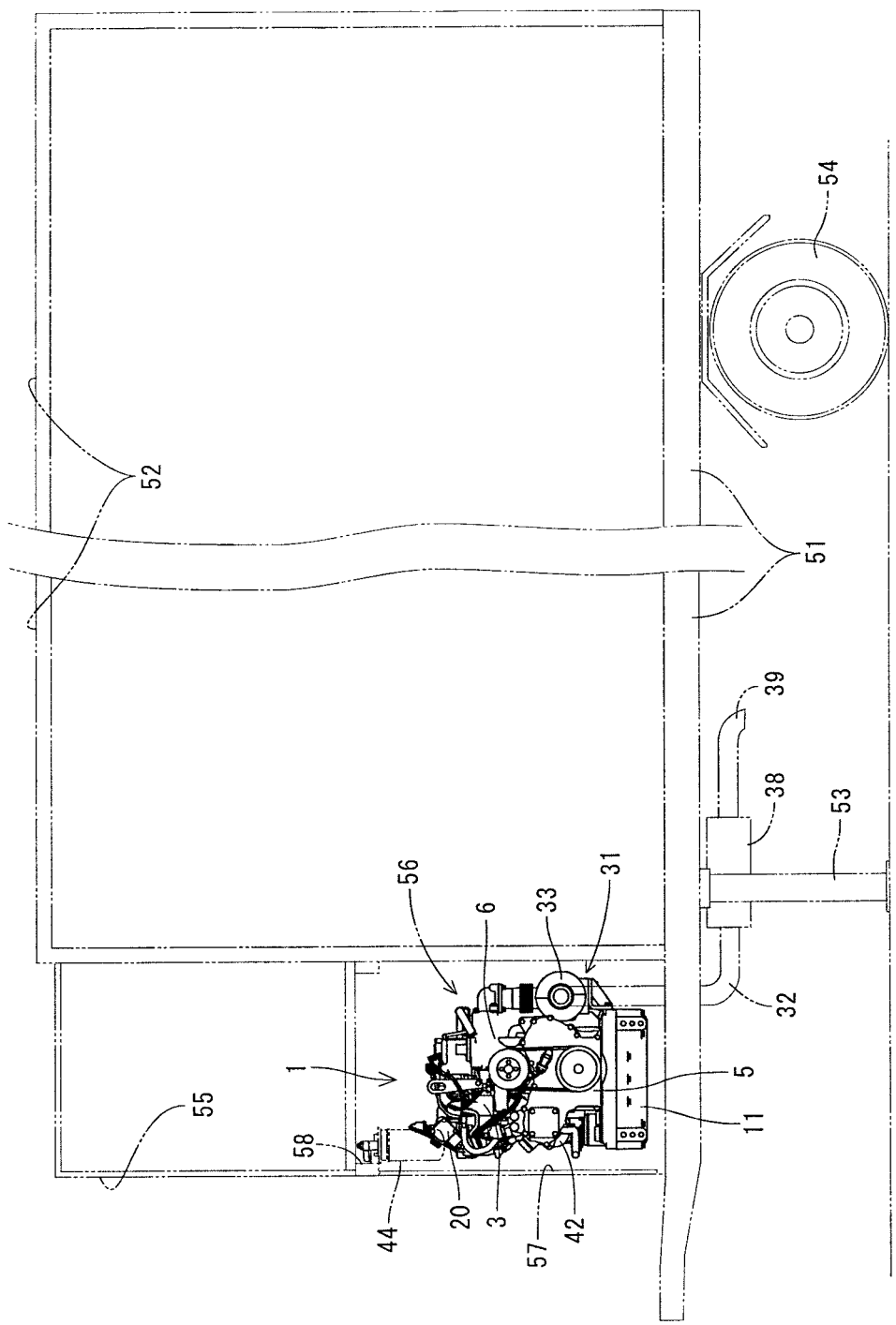
FIG. 1 is a front view of a diesel engine mounted in a container.
Figure 2:
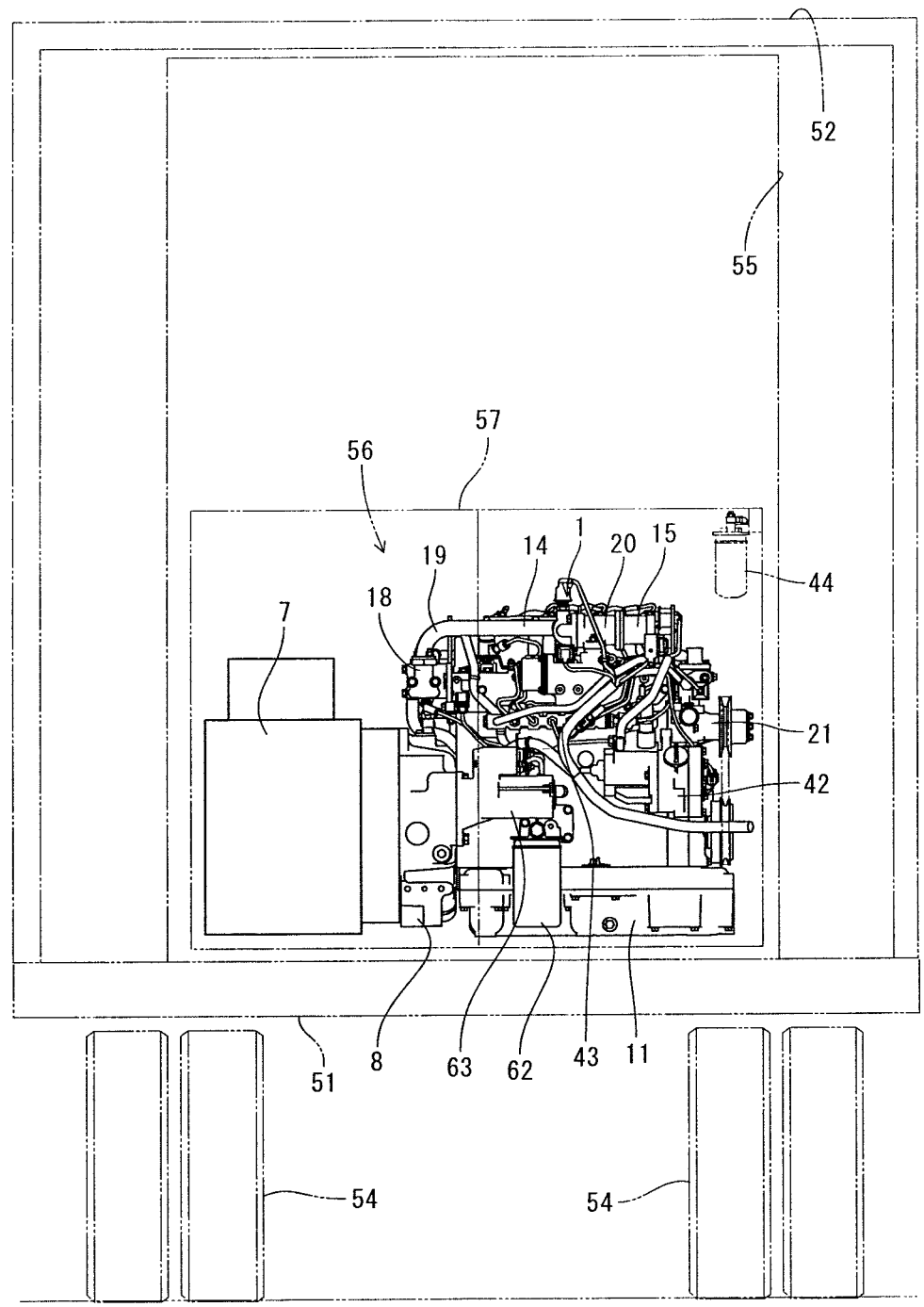
FIG. 2 is a side view of the diesel engine mounted in the container.
Figure 3:
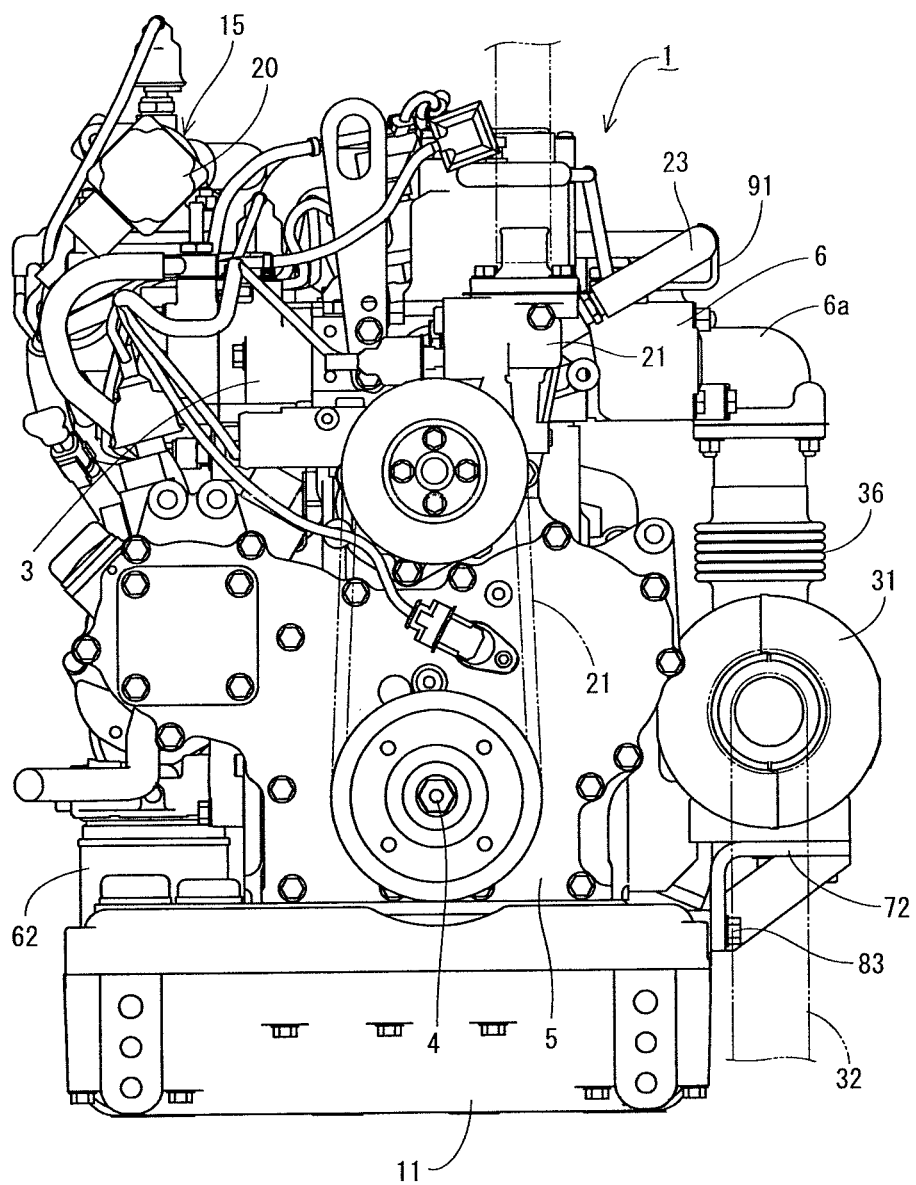
FIG. 3 is a front view of the diesel engine.
Figure 4:
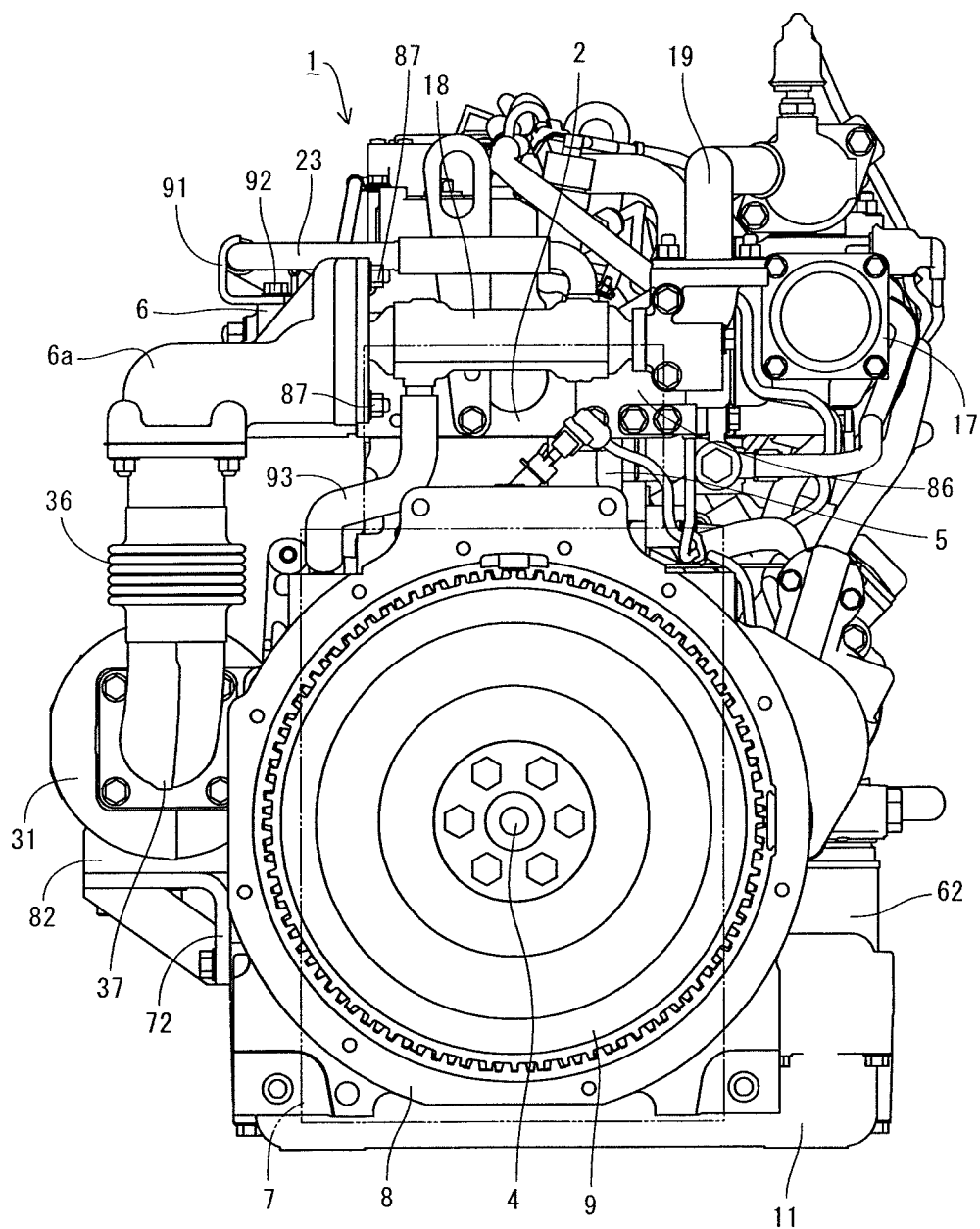
FIG. 4 is a rear view of the diesel engine.
Figure 5:
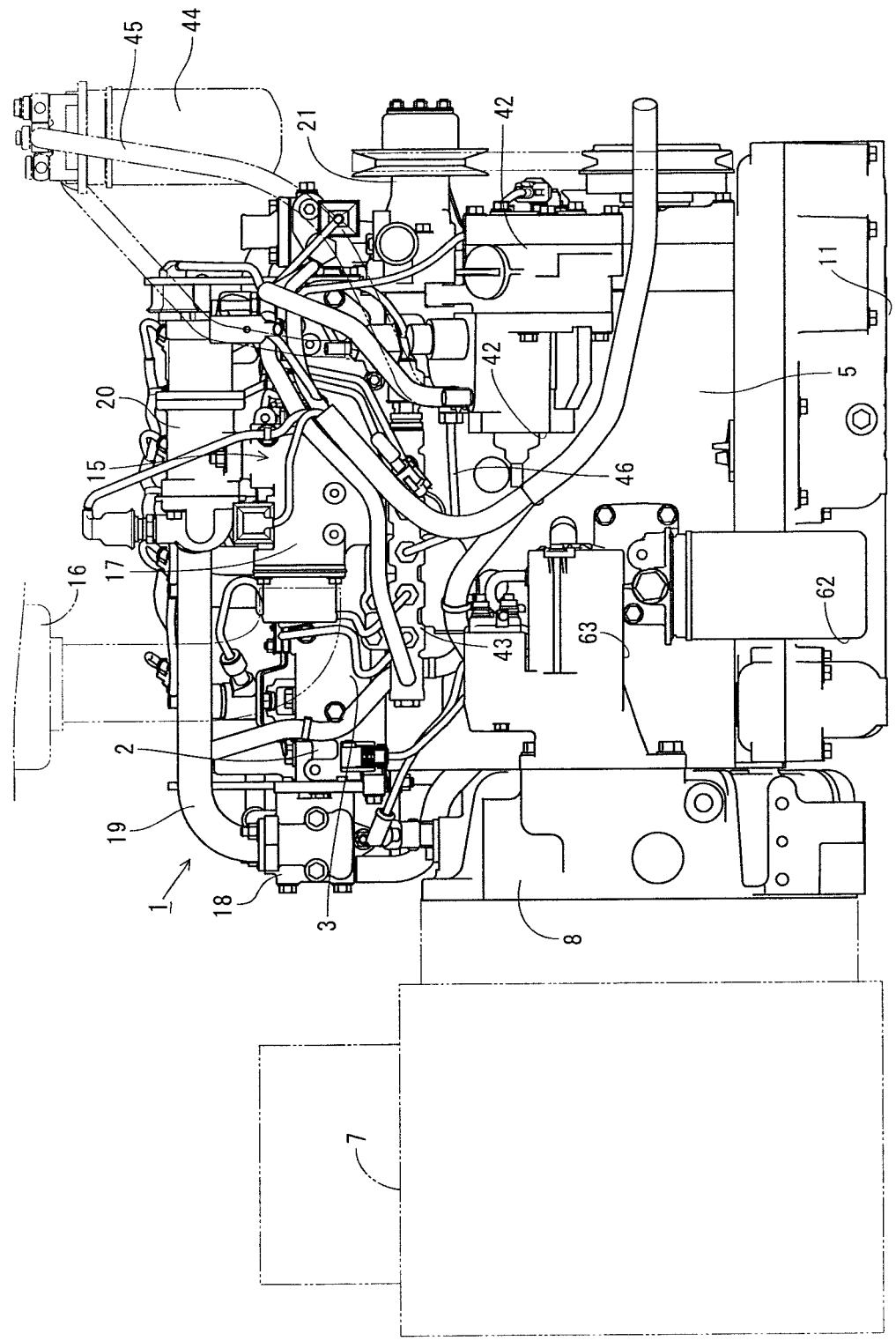
FIG. 5 is a right side view of the diesel engine (on a side on which an intake manifold is disposed).
Figure 6:
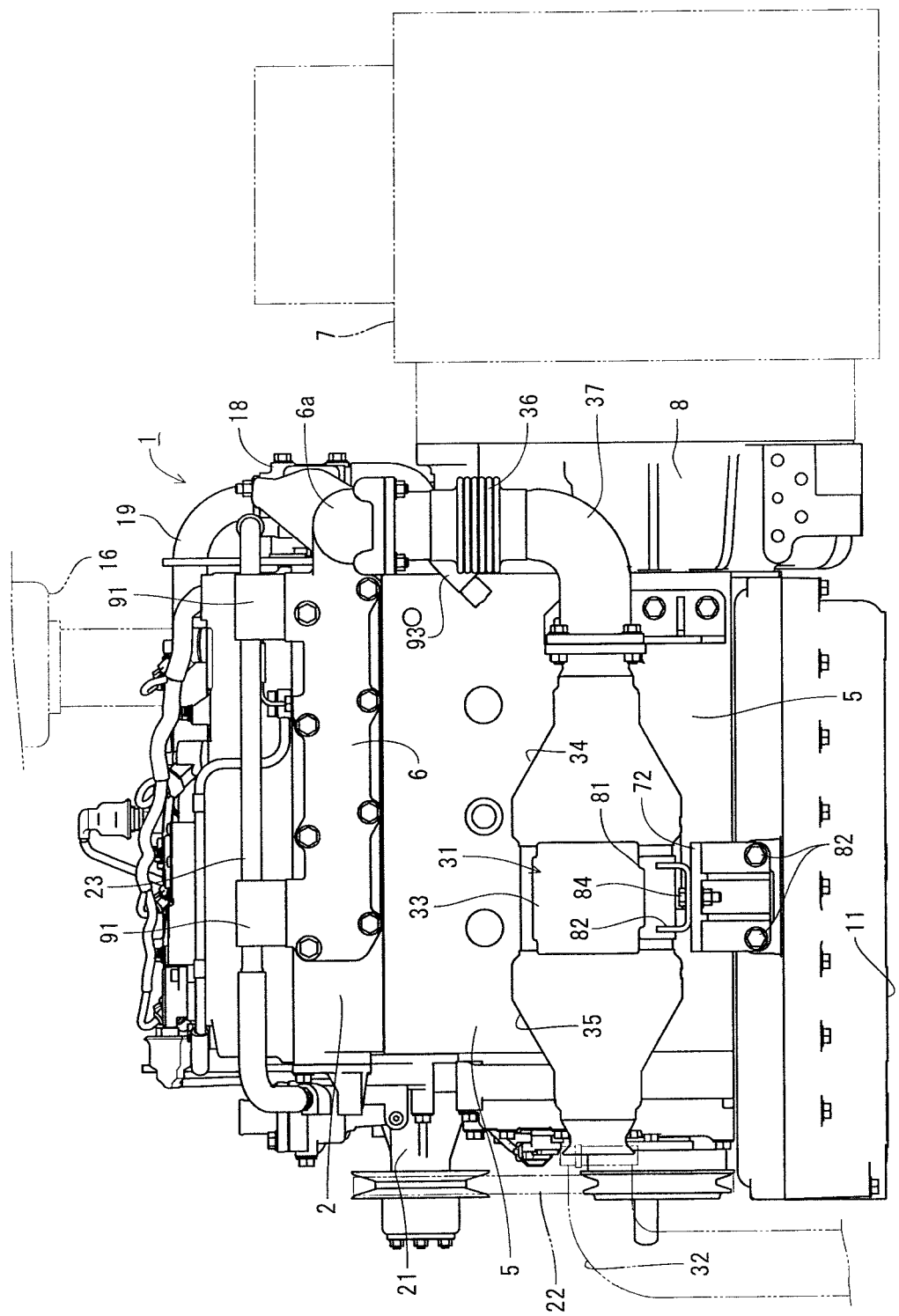
FIG. 6 is a left side view of the diesel engine (on a side on which an exhaust manifold is disposed).
Figure 7:
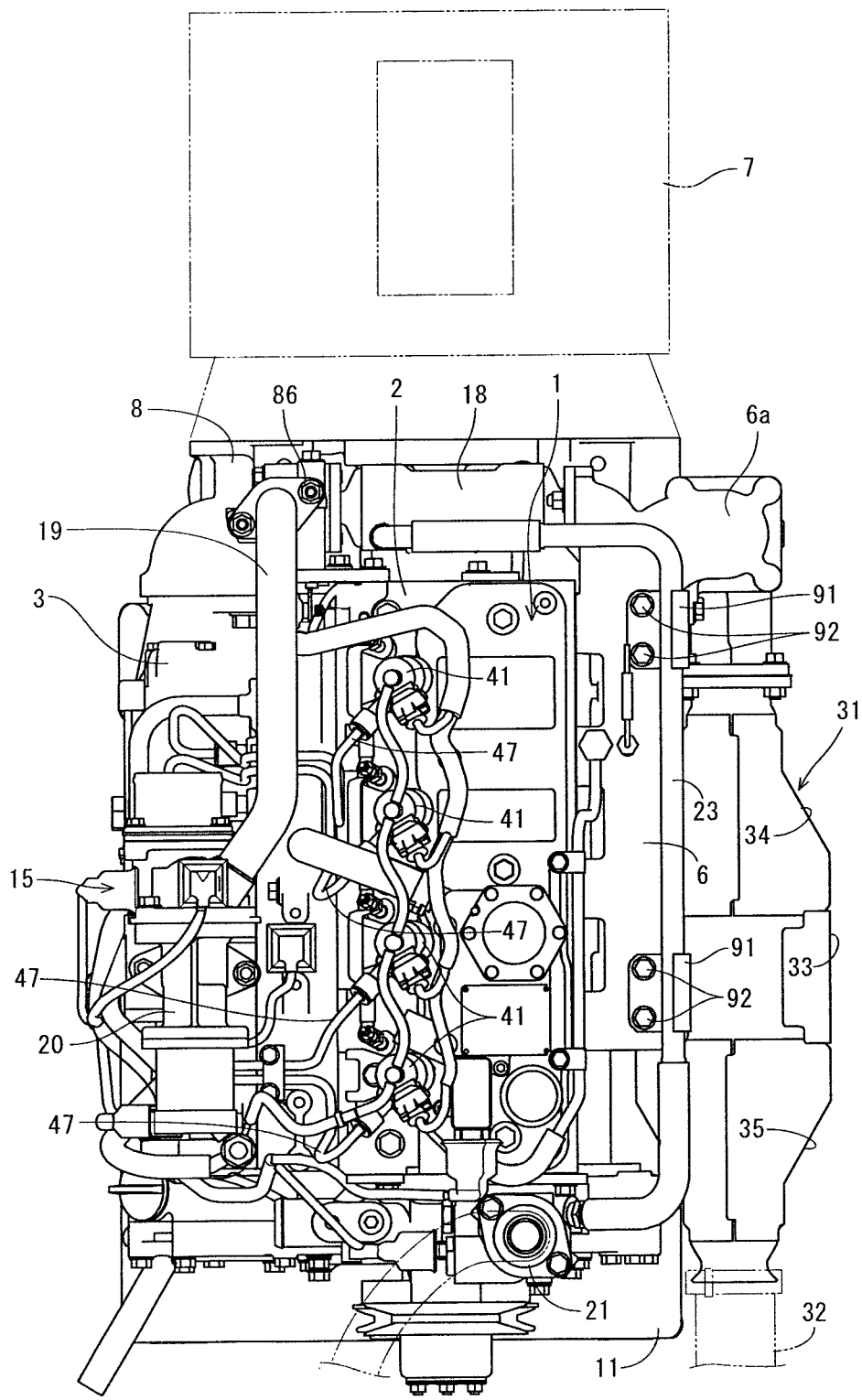
FIG. 7 is a plan view of the diesel engine.
Figure 8:
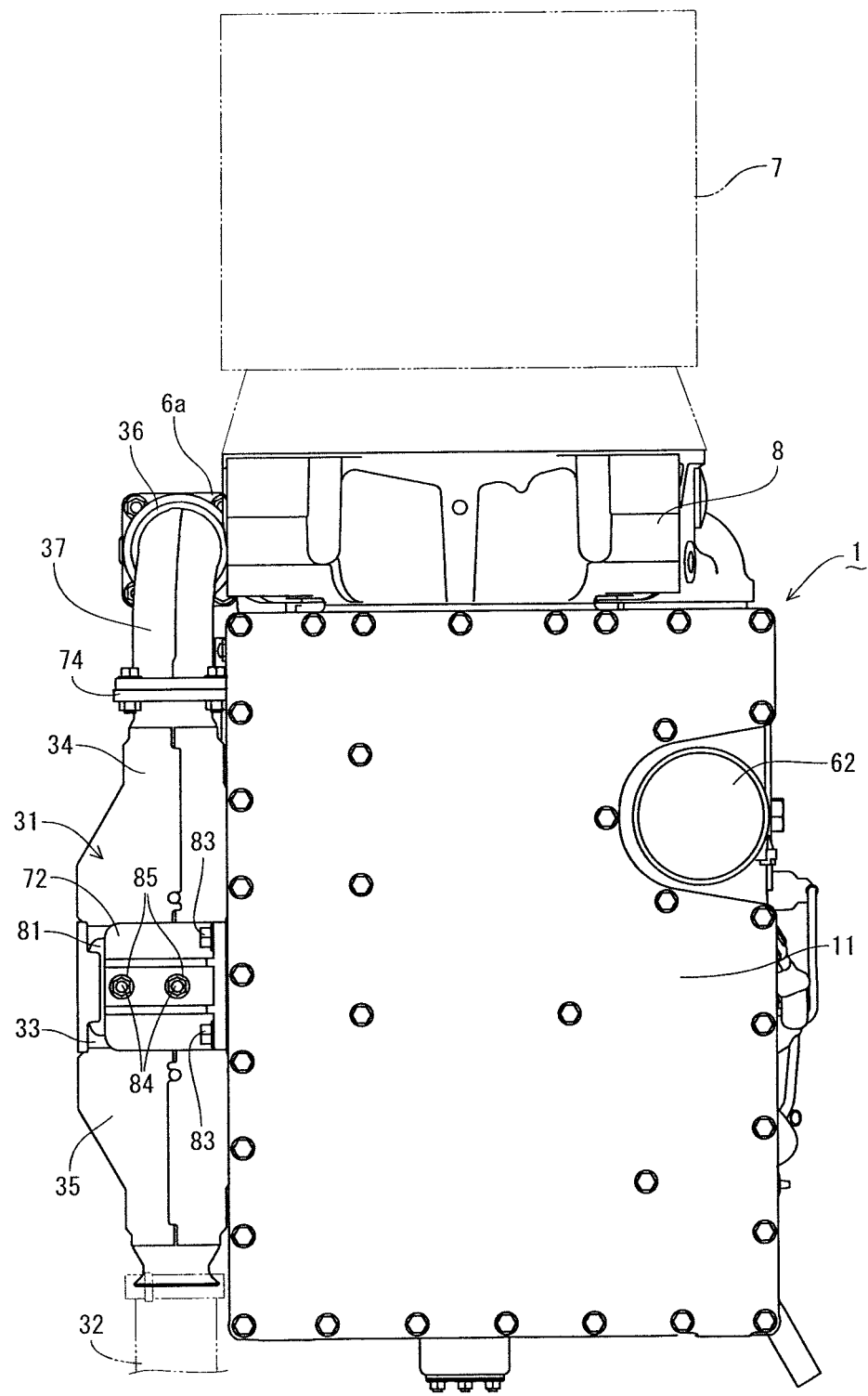
FIG. 8 is a bottom view of the diesel engine.

Hereinafter, embodiments of the present invention are described with reference to drawings. FIG. 1 is a front view of a diesel engine mounted in a container, FIG. 2 is a side view of the diesel engine mounted in the container, FIG. 3 is a front view of the diesel engine, FIG. 4 is a rear view of the diesel engine, FIG. 5 is a side view of the diesel engine on an side on which the intake manifold is disposed, FIG. 6 is a side view of the diesel engine on an exhaust manifold side, FIG. 7 is a plan view of the diesel engine, and FIG. 8 is a bottom view of the diesel engine. With respect to FIGS. 1 to 8, a general structure of a diesel engine 1 is described. Note that in the following description, the side on which the intake manifold is disposed of the diesel engine 1 is simply referred to as a right side of the diesel engine 1, while the exhaust manifold side of the diesel engine 1 is simply referred to as a left side of the diesel engine 1.

As shown in FIGS. 3 to 6, an intake manifold 3 is disposed on a right side face of a cylinder head 2 of the diesel engine 1. The cylinder head 2 is placed on a cylinder block 5 in which an engine output shaft 4 (crankshaft) and pistons (not shown) are housed. An exhaust manifold 6 is disposed on a left side face of the cylinder head 2. Front and rear ends of the engine output shaft 4 protrude from front and rear of the cylinder block 5.

As shown in FIGS. 4 to 6, a flywheel housing 8 is fixed to a rear face of the cylinder block 5. A flywheel 9 is disposed in the flywheel housing 8. A flywheel 9 is pivoted on a rear end side of the engine output shaft 4. In addition, a compressor 7 for compressing refrigerant is disposed as an air conditioning unit. The compressor 7 is fixed to the flywheel housing 8. Power of the diesel engine 1 is output to the compressor 7 via the flywheel 9.

Further, an oil pan 11 is disposed on a bottom face of the cylinder block 5. An area of a flat top face of the oil pan 11 is larger than an area of a flat bottom face of the cylinder block 5. In other words, left and right side portions of the oil pan 11 protrude outward from left and right side faces of the cylinder block 5, and a front portion of the oil pan 11 protrudes frontward from a front face of the cylinder block 5, so that the oil pan 11 is formed to have a large oil storage capacity. Thus, the oil pan 11 stores a large amount of engine oil (not shown) so as to prevent engine oil shortage when the diesel engine 1 is operated continuously for a long period of time.

As shown in FIGS. 4 to 6, an exhaust gas recirculation device (EGR) 15 for taking exhaust gas for recirculation is disposed in the intake manifold 3. An air cleaner 16 is connected to the intake manifold 3. External air after dust removal and cleaning by the air cleaner 16 is sent to the intake manifold 3 and is supplied to each cylinder of the four-cylinder diesel engine 1.

In addition, the exhaust gas recirculation device 15 includes an EGR main body case (collector) 17 for mixing recirculating exhaust gas (EGR gas from the exhaust manifold 6) of the diesel engine 1 with fresh air (external air from the air cleaner 16) so as to supply the mixed gas to the intake manifold 3, a recirculating exhaust gas pipe 19 as a recirculation coupling for connecting to the exhaust manifold 6 via an EGR cooler 18 as exhaust gas cooling means for recirculation, and an EGR valve 20 for adjusting an intake amount of the recirculating exhaust gas. Note that the EGR main body case 17 houses an intake air throttle valve (not shown) for adjusting an intake amount of the fresh air.

With the above-mentioned structure, the recirculating exhaust gas pipe 19 is communicated to the EGR main body case 17 via the EGR valve 20, and a part of the exhaust gas from the diesel engine 1 to the exhaust manifold 6 flows back from the intake manifold 3 to the diesel engine 1 so that a combustion temperature of the diesel engine 1 is lowered. Thus, exhaust amount of nitrogen oxide (NOx) from the diesel engine 1 is reduced, and fuel efficiency of the diesel engine 1 is improved.

Further, a cooling water pump 21 is disposed for circulating cooling water in the cylinder block 5 and a radiator (not shown). The cooling water pump 21 is disposed on a front face of the diesel engine 1. The cooling water pump 21 is connected to a front end portion of the engine output shaft 4 via a V-belt 22 or the like so that the cooling water pump 21 is driven. On the other hand, the EGR cooler 18 is connected to the cooling water pump 21 via a cooling water pipe 23. The cooling water is supplied into the cylinder block 5 from the cooling water pump 21 via the EGR cooler 18.

As shown in FIGS. 3, 4, and 6, an exhaust gas purification device (oxidation catalyst, soot filter) 31 for purifying the exhaust gas from each cylinder of the diesel engine 1 is disposed. The exhaust gas from each cylinder of the diesel engine 1 to the exhaust manifold 6 passes the exhaust gas purification device 31 and the like and is released externally from an exhaust pipe 32. The exhaust gas purification device 31 reduces carbon monoxide (CO), hydrocarbon (HC), and particulate matter (PM) in the exhaust gas from the diesel engine 1.

The exhaust gas purification device 31 includes a DPF case 33. The DPF case 33 is formed in a substantially cylindrical shape extending in a front and rear direction in parallel to the output shaft (crankshaft) 4 of the diesel engine 1 in a plan view. Front and rear sides (one end side and the other end side in a direction of exhaust gas movement) of the DPF case 33 are provided with an exhaust gas inlet pipe 34 for taking the exhaust gas and an exhaust gas outlet pipe 35 for discharging the exhaust gas.

In addition, an exhaust gas coupling 6a is integrally formed on a rear end portion of the exhaust manifold 6 by a die casting process. The exhaust gas coupling 6a is connected to the exhaust gas inlet pipe 34 via a bellows expansion joint 36 and an elbow pipe 37. In other words, the expansion joint 36 extends downward from a bottom face side of the exhaust gas coupling 6a, the elbow pipe 37 extends from a lower end side of the expansion joint 36 to the front, and a rear end side opening of the exhaust gas inlet pipe 34 is fastened to a front end side of the elbow pipe 37. The exhaust gas inlet pipe 34 is communicated to the exhaust manifold 6 of the diesel engine 1, so that the exhaust gas from the diesel engine 1 is led into the DPF case 33.

Further, a rear end side of the exhaust gas outlet pipe 35 is connected to a front face side of the DPF case 33. A front end side outlet of the exhaust gas outlet pipe 35 is connected to a muffler 38 and a tail pipe 39 via the exhaust pipe 32 (see FIG. 1). A diesel oxidation catalyst 40 such as platinum is housed inside the DPF case 33 (see FIGS. 14 and 15). With the above-mentioned structure, contents of carbon monoxide (CO) and hydrocarbon (HC) in the exhaust gas and particulate matter (PM) in the exhaust gas from the diesel engine 1 are reduced.

As described above, the exhaust gas purification device 31 is made only of the diesel oxidation catalyst 40 that oxidizes the carbonous matter or the nitrogen oxide in the exhaust gas discharged from the diesel engine 1. Therefore, compared with a structure in which a honeycomb filter for actively collecting the particulate matter in the exhaust gas is disposed, an outer shape of the exhaust gas purification device 31 can be compact. In addition, because the diesel engine 1 is continuously operated at a specific rotation speed, toxic substances in the exhaust gas can be sufficiently reduced by the diesel oxidation catalyst 40 without disposing a honeycomb filter or the like for actively collecting the particulate matter in the exhaust gas.

Figure 14:
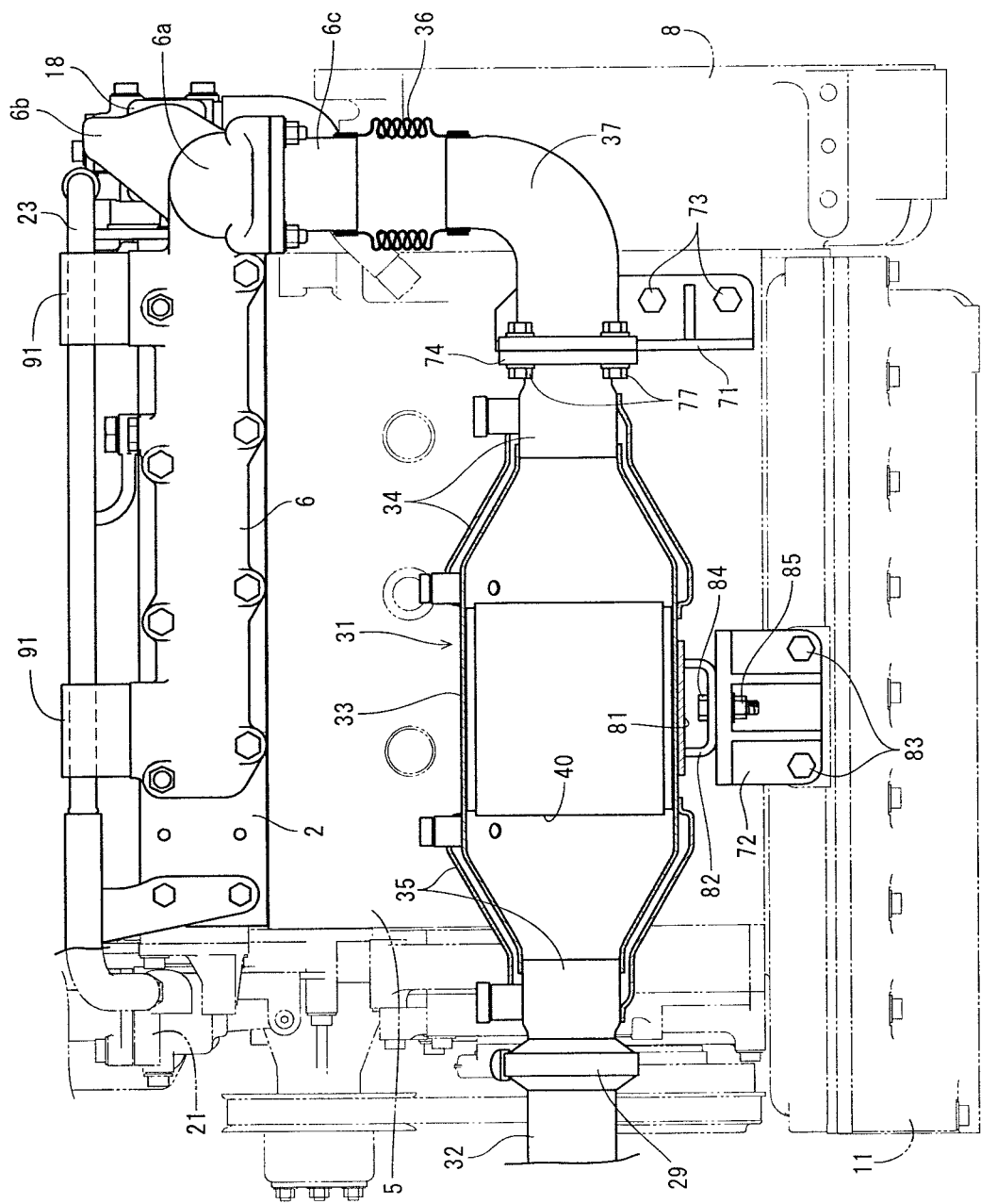
FIG. 14 is a cross-sectional side view of the exhaust gas purification device.
Figure 19:
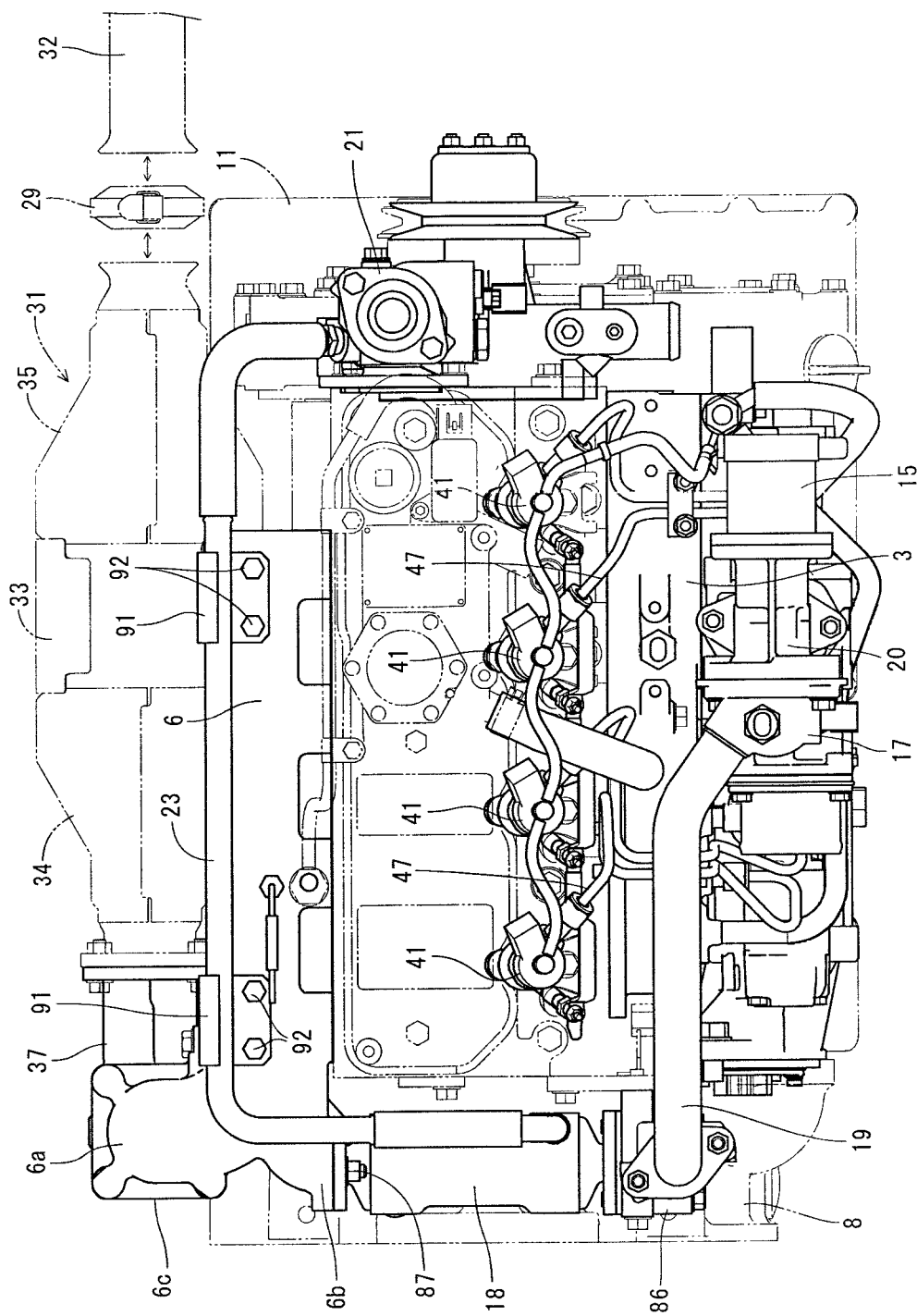
FIG. 19 is a plan view of the common rail and the exhaust gas recirculation device.

Note that as shown in FIGS. 14 and 19, the exhaust pipe 32 is detachably connected to the outlet of the exhaust gas outlet pipe 35 with a metal fastening band 29. As shown in FIG. 1, when an engine room 56 is formed on a front side of a freezing shipping container 52, the exhaust gas purification device 31 is disposed on an outer wall side of the container 52 opposite to a maintenance door 57. In addition, it is necessary to connect the exhaust pipe 32 to the outlet of the exhaust gas outlet pipe 35 in a small space between the outer wall of the container 52 and the exhaust gas purification device 31 after installing the diesel engine 1 in the engine room 56. However, because the exhaust gas outlet pipe 35 can be easily fastened to the exhaust pipe 32 with the fastening band 29 without using a tool such as a wrench for fastening a bolt, the connection work of the exhaust pipe 32 in the small space can be smoothly performed.

Next, with reference to FIGS. 5 and 7, a fuel system structure of the diesel engine 1 is described. As shown in FIGS. 5 and 7, a fuel tank (not shown) is connected to injectors 41 of the four cylinders of the diesel engine 1 via a fuel pump 42 and a common rail 43. Each of the injectors 41 includes a fuel injection valve (not shown) of an electromagnetic switch control type. The common rail 43 is fixed to the right side face of the cylinder head 2, the common rail 43 is disposed adjacent to a lower side of the intake manifold 3, and the common rail 43 is disposed adjacent to the intake manifold 3 and the exhaust gas recirculation device 15.

As shown in FIGS. 5 and 7, an intake side of the fuel pump 42 is connected to the fuel tank (not shown) via a fuel filter 44 and a low-pressure pipe 45. Fuel in the fuel tank is taken into the fuel pump 42 via the fuel filter 44 and the low-pressure pipe 45. On the other hand, a discharge side of the fuel pump 42 is connected to the common rail 43 via a high-pressure pipe 46. The high-pressure pipe 46 is connected to the cylindrical common rail 43 at a midpoint in the longitudinal direction. In addition, the injectors 41 of the four cylinders are connected to the common rail 43 via four fuel injection pipes 47, respectively. End portions of the fuel injection pipes 47 of the four cylinders are respectively connected in the longitudinal direction of the cylindrical common rail 43.

With the above-mentioned structure, the fuel pump 42 sends the fuel in the fuel tank by pressure to the common rail 43, and high pressure fuel is stored in the common rail 43. When the fuel injection valve of each injector 41 is controlled to switch, the high pressure fuel in the common rail 43 is injected to each cylinder of the diesel engine 1 from each injector 41. In other words, by electronic control of the fuel injection valve of each injector 41, injection pressure, injection timing, injection period (injection quantity) of the fuel supplied from each injector 41 can be controlled with high accuracy. Therefore, the nitrogen oxide (NOx) discharged from the diesel engine 1 can be reduced. Noise and vibration of the diesel engine 1 can be reduced.

Note that the fuel pump 42 is driven by the engine output shaft 4. The fuel tank is connected to the fuel pump 42 via the fuel return pipe. A common rail return pipe is connected to an end portion in the longitudinal direction of the cylindrical common rail 43 via a return pipe connector for limiting fuel pressure inside the common rail 43. In other words, excess fuel in the fuel pump 42 as well as excess fuel in the common rail 43 is retrieved to the fuel tank via the fuel return pipe and the common rail return pipe.

Next, a use example of the diesel engine 1 is described with reference to FIGS. 1 and 2. As shown in FIGS. 1 and 2, the freezing shipping container 52 for cargo transportation having a rectangular box shape to be used for transporting frozen cargo or the like is mounted on a trailer body 51 towed by a tractor (not shown). The trailer body 51 is supported horizontally by front support legs 53 that are retractable and rear wheels 54 so as to be stored in a certain place, while a front portion of the trailer body 51 is linked to a rear portion of the tractor by retracting the front support legs 53 so that the tractor tows the trailer body 51.

In addition, an air conditioning housing 55 for the air conditioning unit is disposed in a front face portion of the cargo transportation container 52. An air conditioning unit (not shown) for controlling temperature inside the container 52 is disposed in the air conditioning housing 55. The engine room 56 is formed below the air conditioning housing 55. The diesel engine 1 and the compressor 7 as a part of the air conditioning unit are disposed in the engine room 56. The diesel engine 1 operates the compressor 7, and the compressor 7 compresses refrigerant in the air conditioning unit, so that temperature in the cargo transportation container 52 is kept at cold insulation temperature (such as −20° C.) suitable for storing frozen cargo. Further, as shown in FIG. 1, the fuel filter 44 is disposed on a side of a machine frame 58 of the air conditioning housing 55 in which the diesel engine 1 is installed, and the fuel filter 44 is supported in an upper part of the engine room 56, so that the fuel filter 44 is connected to the fuel pump 42 of the diesel engine 1.

Figure 20:
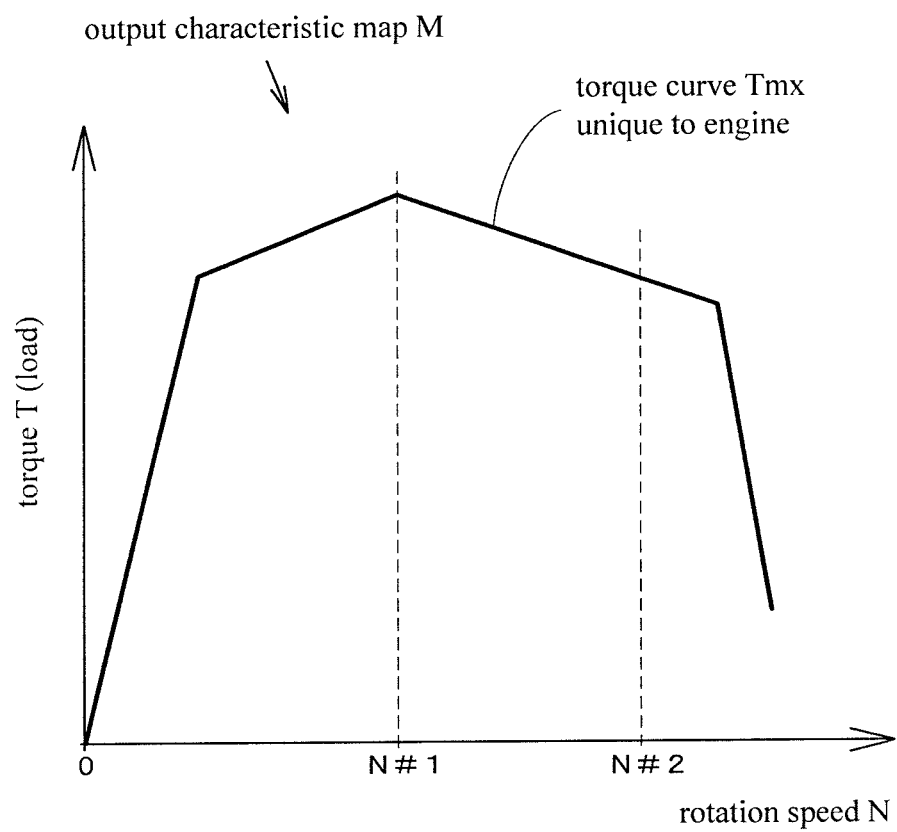
FIG. 20 is a speed/power diagram of the diesel engine.

Note that FIG. 20 shows a torque curve Tmx unique to the engine 1, which is determined by the output characteristic map M indicating a relationship between torque T of the engine 1 and rotation speed N. As shown in FIG. 20, the rotation speed N of the engine 1 is controlled in such a manner that the rotation speed N of the engine 1 is restricted to only two rotation speeds N #1 and N #2. The rotation speed N of the engine 1 is initially set to be maintained at one of the intermediate rotation speed N #1 on a low speed side and the rated rotation speed N #2 on a high speed side. When frozen cargo is transported using the cargo transportation container 52, in a period until the temperature in the cargo transportation container 52 is decreased to the cold insulation temperature, the diesel engine 1 is rotated fast at the rated rotation speed N #2 constantly, so that the temperature in the cargo transportation container 52 is dropped to the cold insulation temperature in short period of time. On the other hand, when the temperature in the cargo transportation container 52 is decreased to the cold insulation temperature, the diesel engine 1 is rotated slowly at the intermediate rotation speed N #1 constantly, so that the temperature in the cargo transportation container 52 is maintained at the cold insulation temperature. When the diesel engine 1 is operated at the intermediate rotation speed N #1, contents of carbon monoxide (CO) and hydrocarbon (HC) in the exhaust gas and particulate matter (PM) in the exhaust gas from the diesel engine 1 are reduced by the diesel oxidation catalyst 40.

As shown in FIGS. 1, 2, 12, and 18, the maintenance door 57 is disposed in a front face portion of the engine room 56 in an openable and closable manner. When the door 57 is opened, the front face of the engine room 56 is opened toward the front. In addition, the front of the diesel engine 1 faces the left side of the cargo transportation container 52, and the diesel engine 1 is disposed in the right side of the engine room 56 while the compressor 7 is disposed on the left side of the engine room 56, facing the front of the cargo transportation container 52. In other words, the right side face of the diesel engine 1 and the right side face of the compressor 7 are opposed to the front face opening of the engine room 56.

Further, as shown in FIGS. 1, 2, 12, and 18, the intake manifold 3 is disposed on the right side of the diesel engine 1. The EGR valve 20 as an exhaust gas recirculation valve and the common rail 43 are disposed on the side of the diesel engine 1 on which the intake manifold 3 is disposed, and the EGR cooler 18 as exhaust gas cooling means for cooling recirculation exhaust gas is disposed on the side face of the diesel engine 1 adjacent to the side on which the intake manifold 3 is disposed, so that the side of the diesel engine 1 on which the intake manifold 3 is disposed faces the maintenance door 57 of the engine room 56 in which the diesel engine 1 is disposed.

Figure 12:
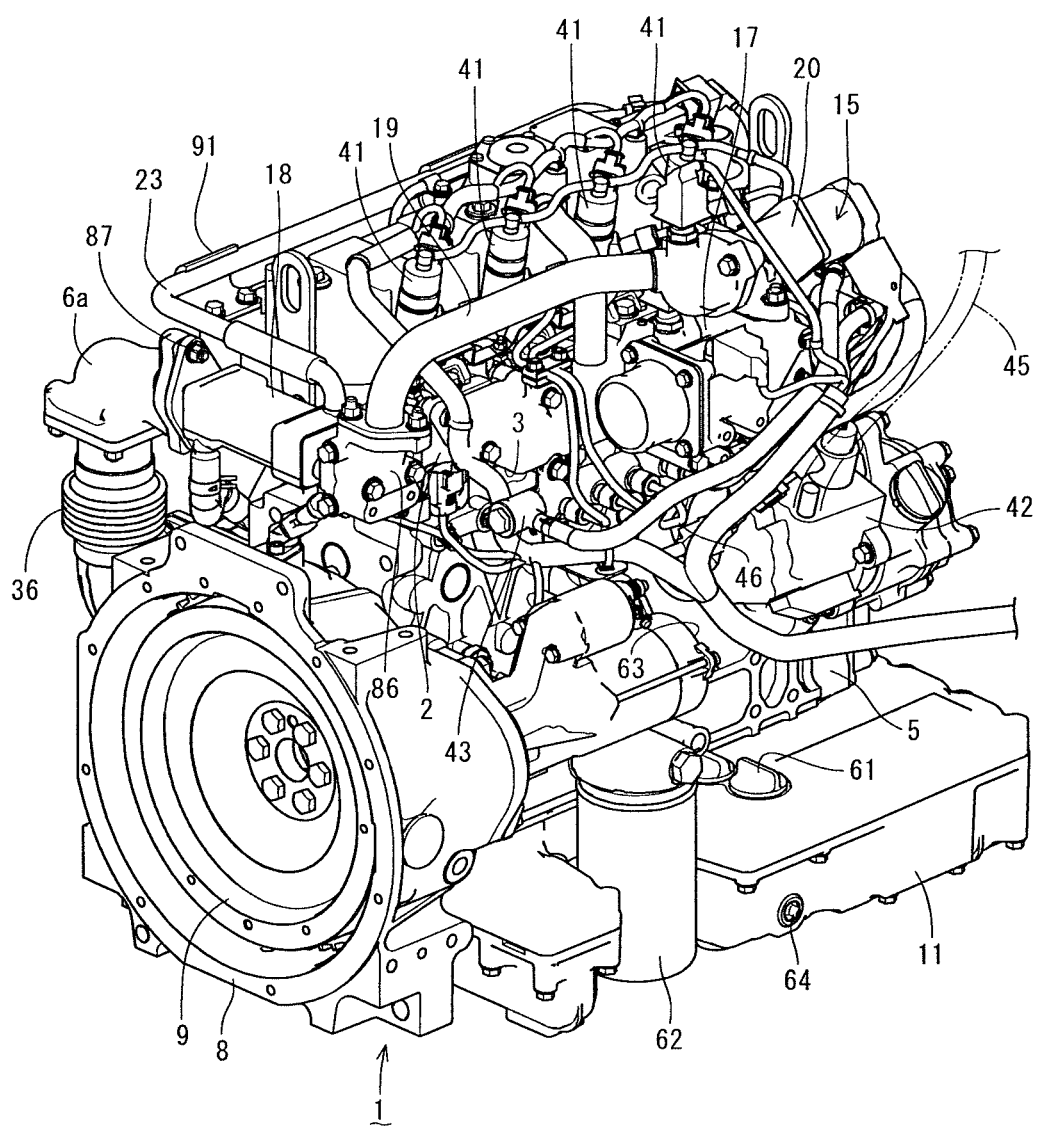
FIG. 12 is a right side perspective view from rear side of the diesel engine (side on which the intake manifold is disposed).
Figure 18:
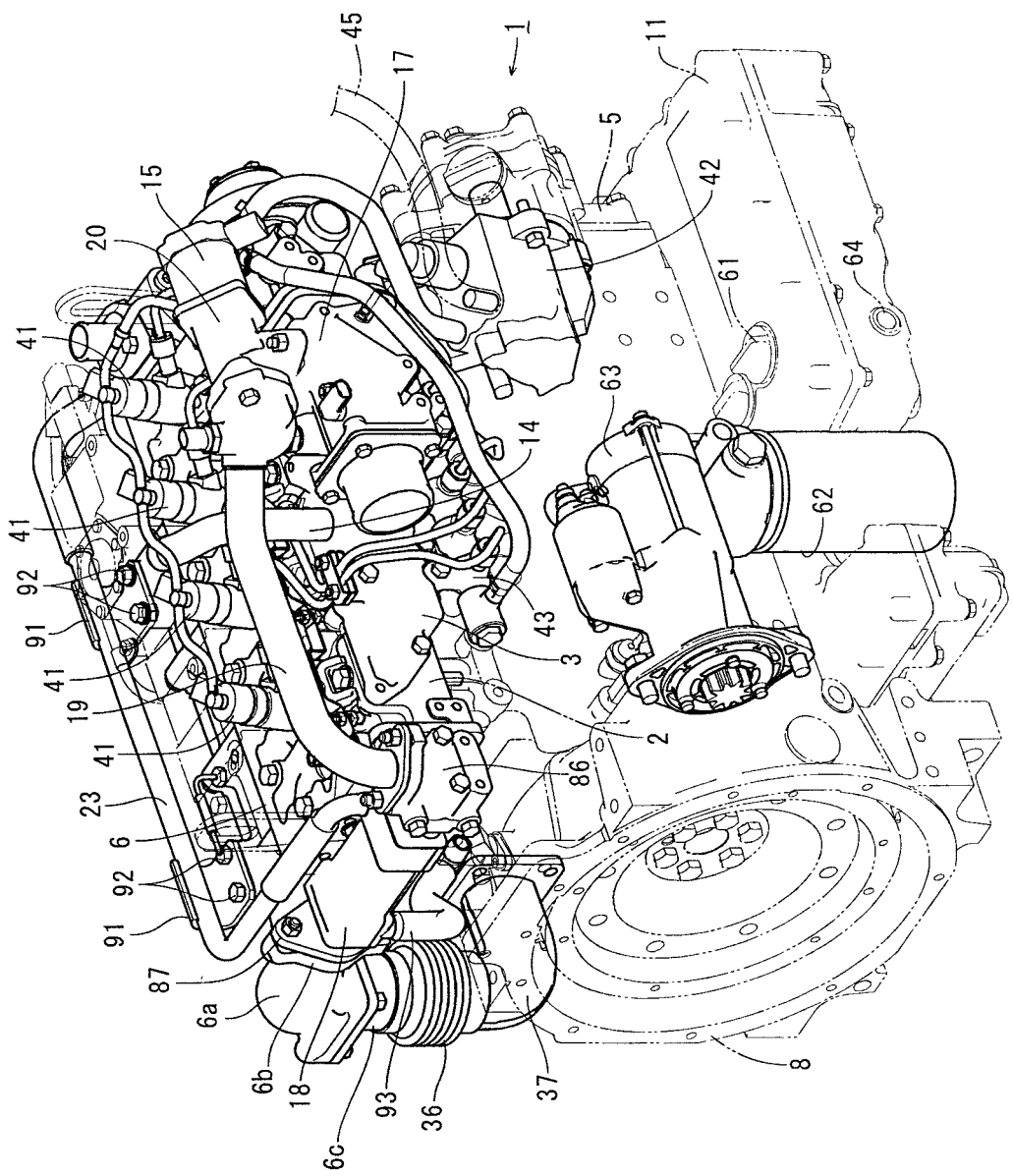
FIG. 18 is a perspective view of the common rail and the exhaust gas recirculation device viewed from above.

In addition, as shown in FIGS. 12 and 18, an oil supply lid 61 for engine oil that closes an oil supply opening in a top face of the oil pan 11, a filter 62 for filtering the engine oil, a starter 63 for starting the diesel engine 1, and the fuel pump 42 are disposed on the side of the diesel engine 1 on which the intake manifold 3 is disposed. On the other hand, in the top face of the diesel engine 1, the injector 41 is disposed at a part near the side of the diesel engine 1 on which the intake manifold 3 is disposed. Note that a drain cap 64 for draining oil in the oil pan 11 is disposed at a lower part of the side face on which the intake manifold 3 is disposed among side faces of the oil pan 11.

With the above-mentioned structure, maintenance check or the like of the EGR valve 20, the common rail 43, and the EGR cooler 18 can be performed by an operator who is in the front of the trailer body 51 from the front face opening side of the engine room 56. On the other hand, engine oil supply through the oil supply opening by opening and closing the oil supply lid 61, exchange of the engine oil filter 62, and maintenance check of the starter 63, the fuel pump 42, or the injector 41 can be performed from the front face opening side of the engine room 56 in the same manner as described above.

As shown in FIGS. 1, 2, 12, and 18, in the engine device mounted in the container, in which the air conditioning unit (compressor 7) mounted in the cargo transportation container 52 is driven by the diesel engine 1, the exhaust gas recirculation valve (EGR valve 20) and the common rail 43 are disposed on the side of the diesel engine 1 on which the intake manifold 3 is disposed, and the exhaust gas cooling means (EGR cooler 18) for cooling the recirculation exhaust gas is disposed on the side face of the diesel engine 1 adjacent to the side on which the intake manifold 3 is disposed, so that the side of the diesel engine 1 on which the intake manifold 3 is disposed faces the maintenance door 57 of the engine room 56 in which the diesel engine 1 is disposed. Therefore, by opening the maintenance door 57, maintenance of the EGR valve 20, the common rail 43, and the EGR cooler 18 can be performed from one direction. Because it is not necessary to open largely the engine room 56 in multiple directions when maintenance check of the diesel engine 1 is performed, the diesel engine 1 can be compactly disposed in a small space. In addition, it is possible to prevent forgetting to perform maintenance on each portion of the diesel engine 1. It is possible to improve workability of the maintenance check of the diesel engine 1 by performing the maintenance work from one direction.

As shown in FIGS. 1, 2, 12, and 18, the oil supply lid 61 for engine oil, the engine oil filter 62, the starter 63, and the fuel pump 42 are disposed on the side of the diesel engine 1 on which the intake manifold 3 is disposed, while the injector 41 is disposed at a part of the top face of the diesel engine 1 near the side of the diesel engine 1 on which the intake manifold 3 is disposed. Therefore, workability of supplying engine oil, workability of exchanging the engine oil filter 62, or workability of maintenance of the starter 63, the fuel pump 42, the injector 41, or the like can be improved, and at the same time, it is possible to prevent forgetting to perform maintenance on them when maintenance check of the diesel engine 1 is performed. Workability of the maintenance check of the diesel engine 1 can be further improved.

Next, with reference to FIGS. 9, 10, and 13 to 15, a mounting structure of the exhaust gas purification device 31 is described. As shown in FIGS. 9, 10, and 13 to 15, the exhaust gas purification device 31 is disposed in an exhaust path of the diesel engine 1. The oil pan 11 is disposed in the bottom of the diesel engine 1. The side face of the oil pan 11 protrudes outward from the side face of the cylinder block 5 among side faces of the diesel engine 1. The exhaust gas purification device 31 is disposed adjacent to the side face of the cylinder block 5 and the top face of the oil pan 11. In other words, the exhaust gas purification device 31 is disposed at a connection portion of the side face of the cylinder block 5 and the top face of the oil pan 11 (corner part).

There are a first bracket 71 disposed on a side face portion of the cylinder block 5 forming the diesel engine 1 and a second bracket 72 disposed on a side face portion of the oil pan 11. The first bracket 71 is disposed as a support body for linking the exhaust gas purification device 31 to the cylinder block 5. It is configured to support the exhaust gas inlet pipe 34 of the exhaust gas purification device 31 by the cylinder block 5. The first bracket 71 is fastened to the side face portion of the cylinder block 5 with a bolt 73. An end portion of the exhaust gas inlet pipe 34 on the exhaust gas inlet side is provided integrally with a flange body 74, and one side portion of the flange body 74 is fastened to the first bracket 71 with bolts 75 and nuts 76.

Figure 13:
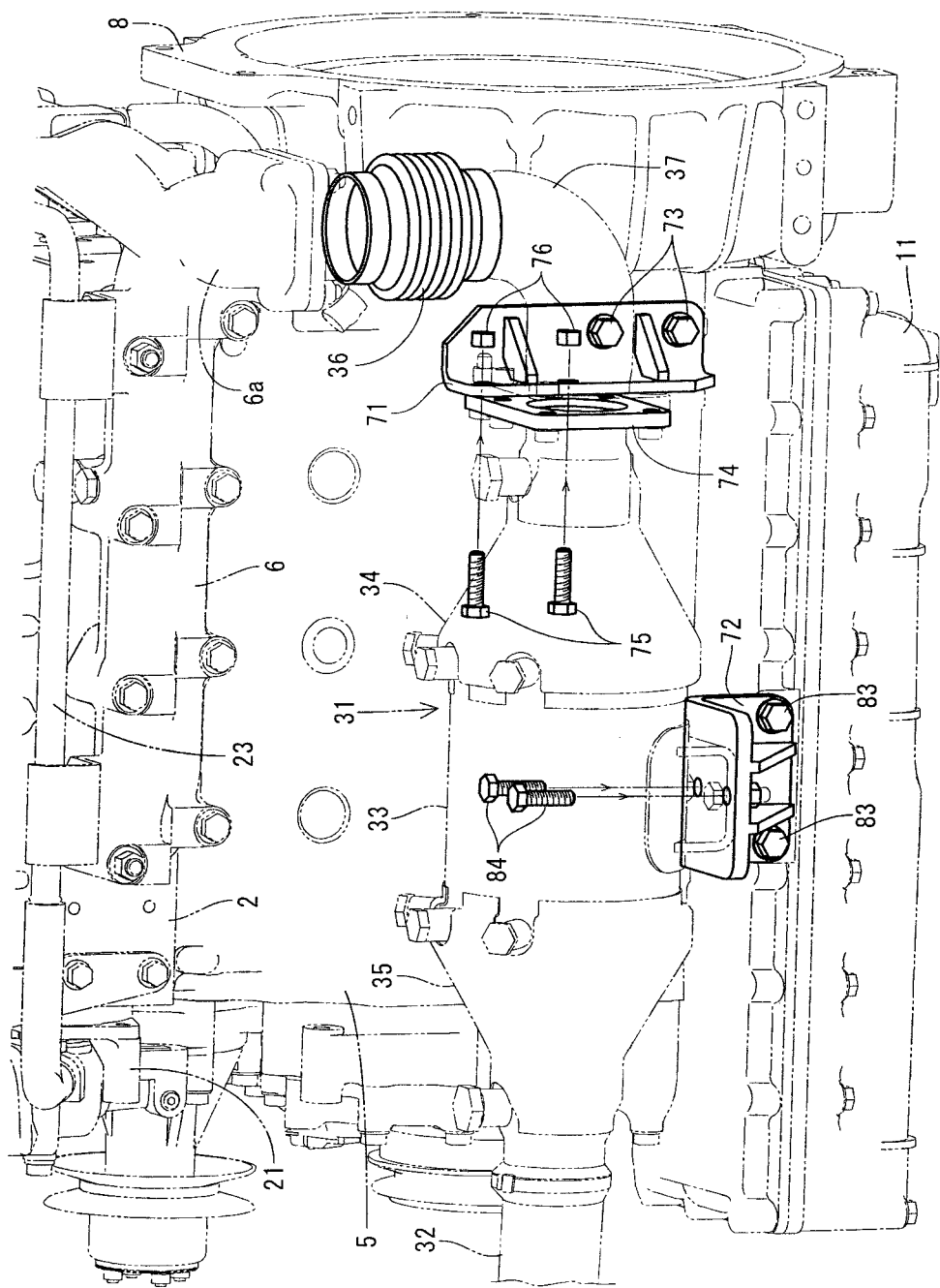
FIG. 13 is a perspective view of a mounting portion of the exhaust gas purification device.

In addition, as shown in FIGS. 13 and 14, one end side of elbow pipe 37 is connected to the expansion joint 36 and the other end side of the same is fastened to the flange body 74 with bolts 77. In other words, the flange body 74 is used for connecting the exhaust gas inlet pipe 34 (DPF case 33) to the cylinder block 5 and is also used for connecting the elbow pipe 37 to the exhaust gas inlet pipe 34. Therefore, the cylinder block 5, the DPF case 33, and the elbow pipe 37 can be connected in high rigidity with a small number of components.

Figure 15:
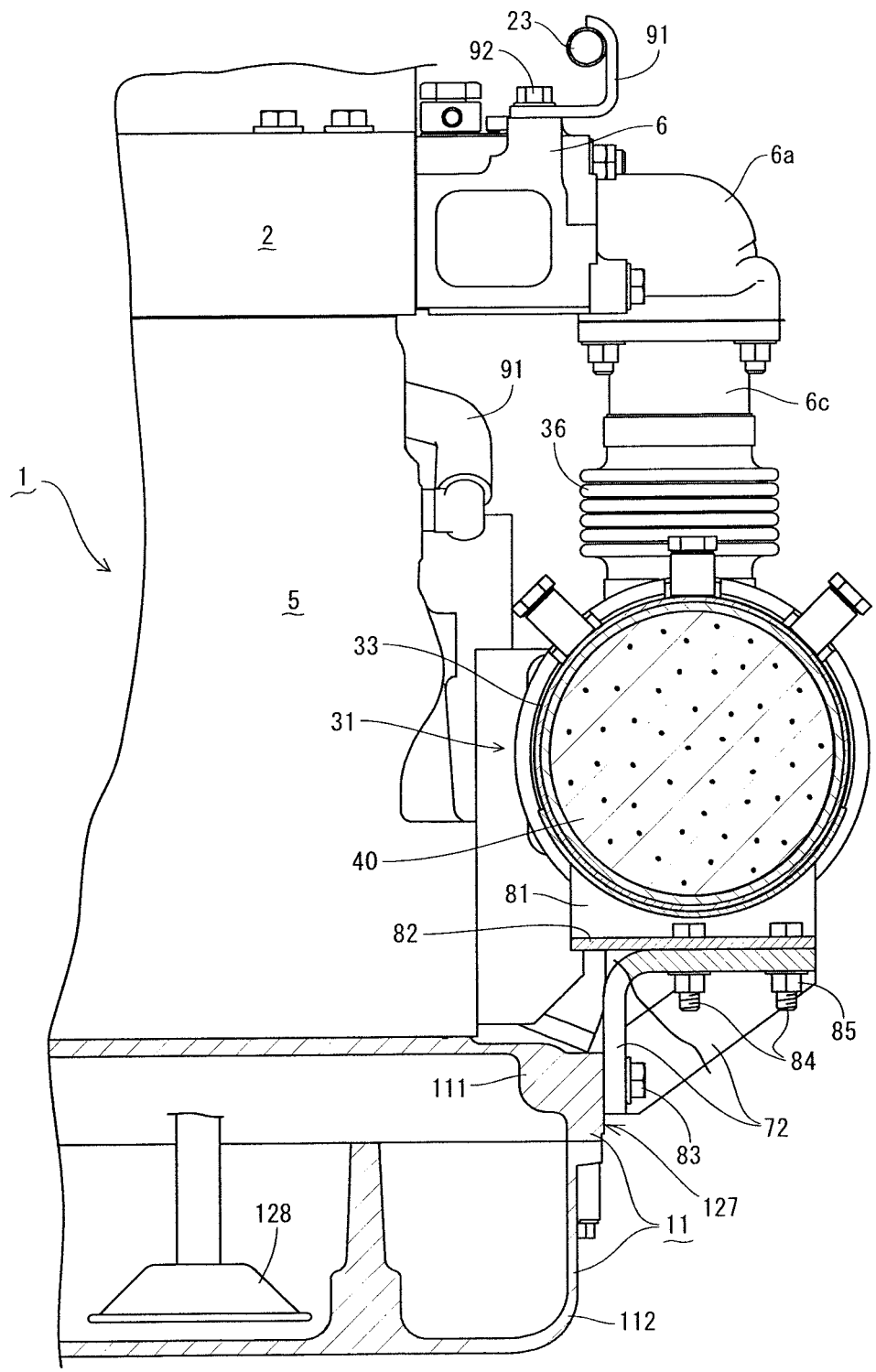
FIG. 15 is a cross-sectional front view of the exhaust gas purification device.
Figure 16:
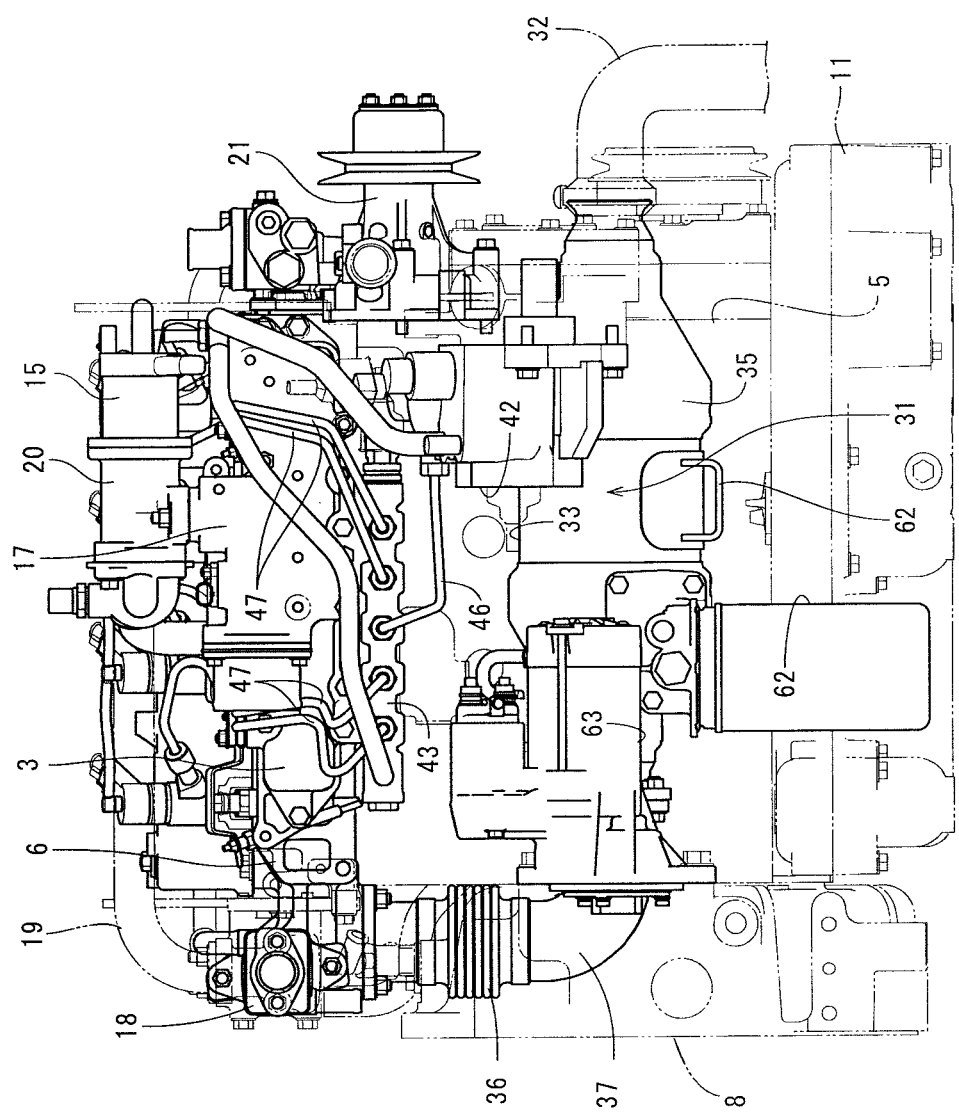
FIG. 16 is a side view of a common rail and an exhaust gas recirculation device portion.

Further, as shown in FIGS. 13 and 15, there is disposed the second bracket 72 as a support body for linking the exhaust gas purification device 31 to the oil pan 11. It is configured to support the DPF case 33 of the exhaust gas purification device 31 by the oil pan 11. A reception frame 82 is welded and fixed to the bottom face of the DPF case 33 via a reinforcing plate 81. A vertical portion of the second bracket 72 is fastened with bolts 83 to an outer side face of the oil pan 11, and a horizontal portion of the second bracket 72 is fastened with bolts 84 and nuts 85 to a bottom face of the reception frame 82.

In other words, the exhaust gas purification device 31 is connected to the first bracket 71 and the second bracket 72, and the exhaust manifold 6 of the engine 1 is connected to the exhaust gas purification device 31 via the expansion joint 36. In the side face portion of the exhaust gas purification device 31, the first bracket 71 is fastened to the side face portion of the exhaust gas inlet side end portion. The second bracket 72 is fastened to the bottom face portion of the exhaust gas purification device 31. Note that it is possible to fasten the support body (first bracket 71) to the side face portion of an end portion of the exhaust gas on the outlet side in the side face portion of the exhaust gas purification device 31.

As shown in FIGS. 1, 9, 10, and 13 to 15, in the engine device mounted in the container, in which the air conditioning unit (compressor 7) or the like mounted in the cargo transportation container 52 is driven by the diesel engine 1, the exhaust gas purification device 31 is disposed in the exhaust path of the diesel engine 1, while the oil pan 11 is disposed on the bottom of the diesel engine 1. In this structure, there is provided the second bracket 72 as the support body for linking the exhaust gas purification device 31 to the oil pan 11, so that the exhaust gas purification device 31 is supported by the oil pan 11. Therefore, the exhaust gas purification device 31 can be compactly assembled near the diesel engine 1. The exhaust gas purification device 31 can be disposed without substantially increasing mounting width dimensions (height, right and left width, front and rear width) of the diesel engine 1. In other words, frozen cargo load capacity of the container 52 can be easily secured, and at the same time, the diesel engine 1 can be compactly mounted in the container 52.

Figure 9:
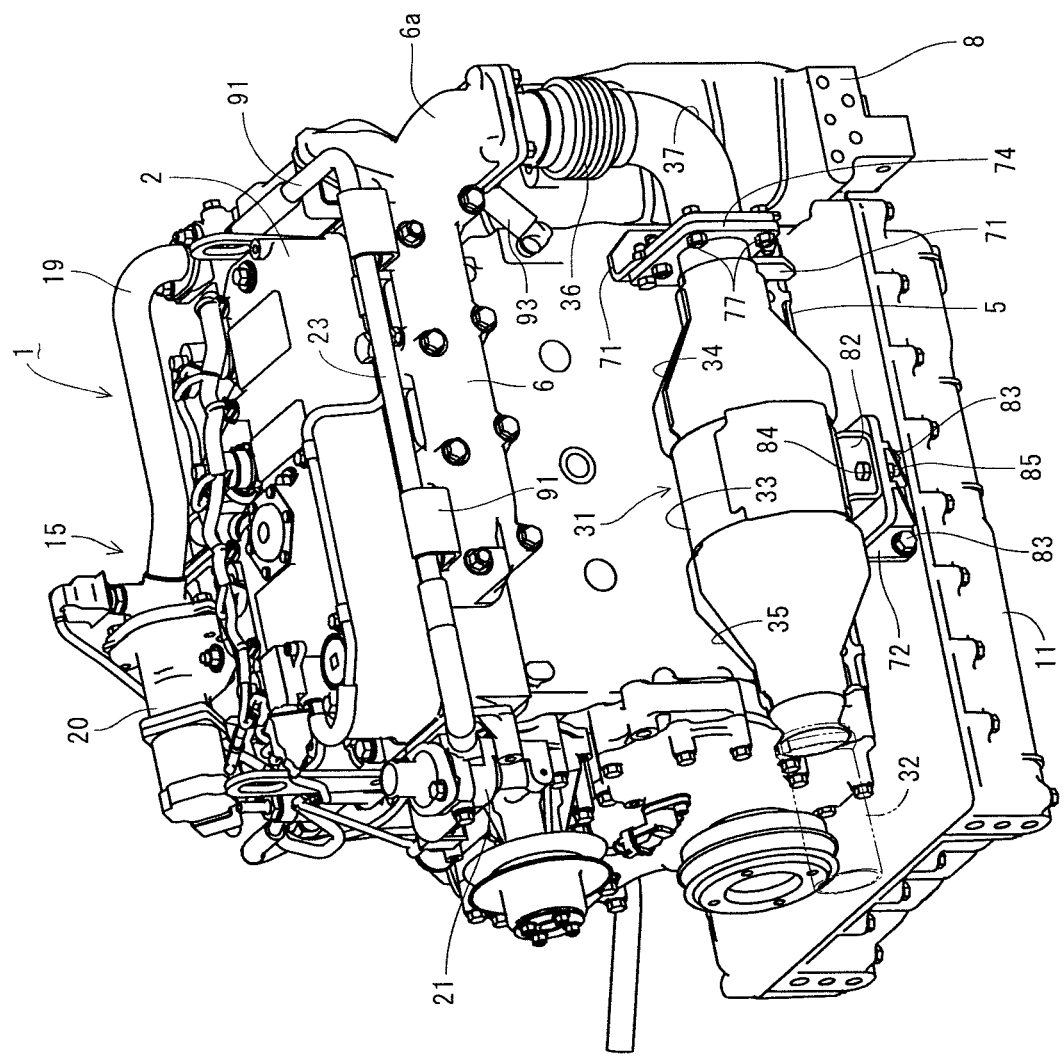
FIG. 9 is a left side perspective view from front side of the diesel engine (side on which the exhaust manifold is disposed).
Figure 10:
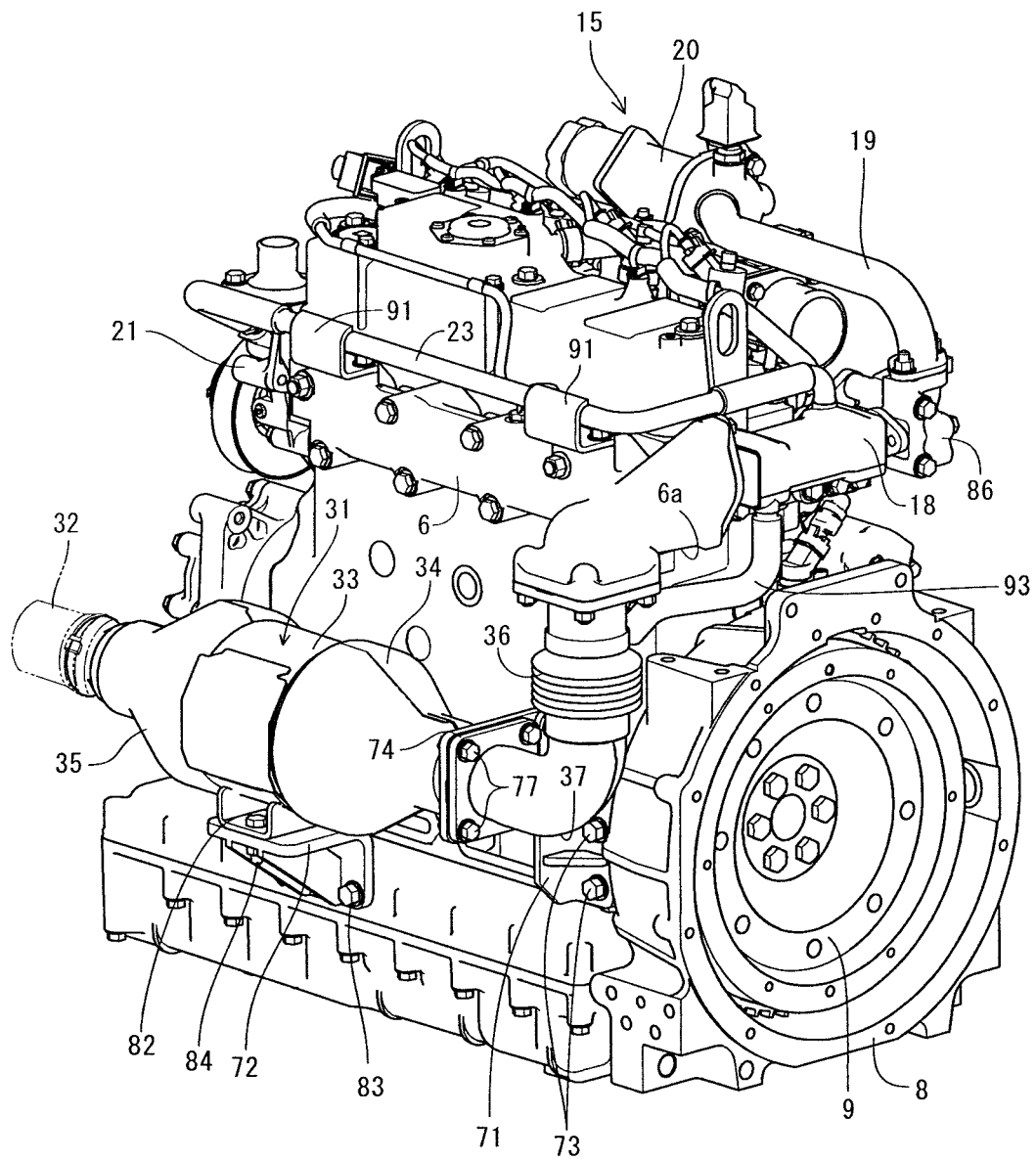
FIG. 10 is a left side perspective view from rear side of the diesel engine (side on which the exhaust manifold is disposed).
Figure 11:
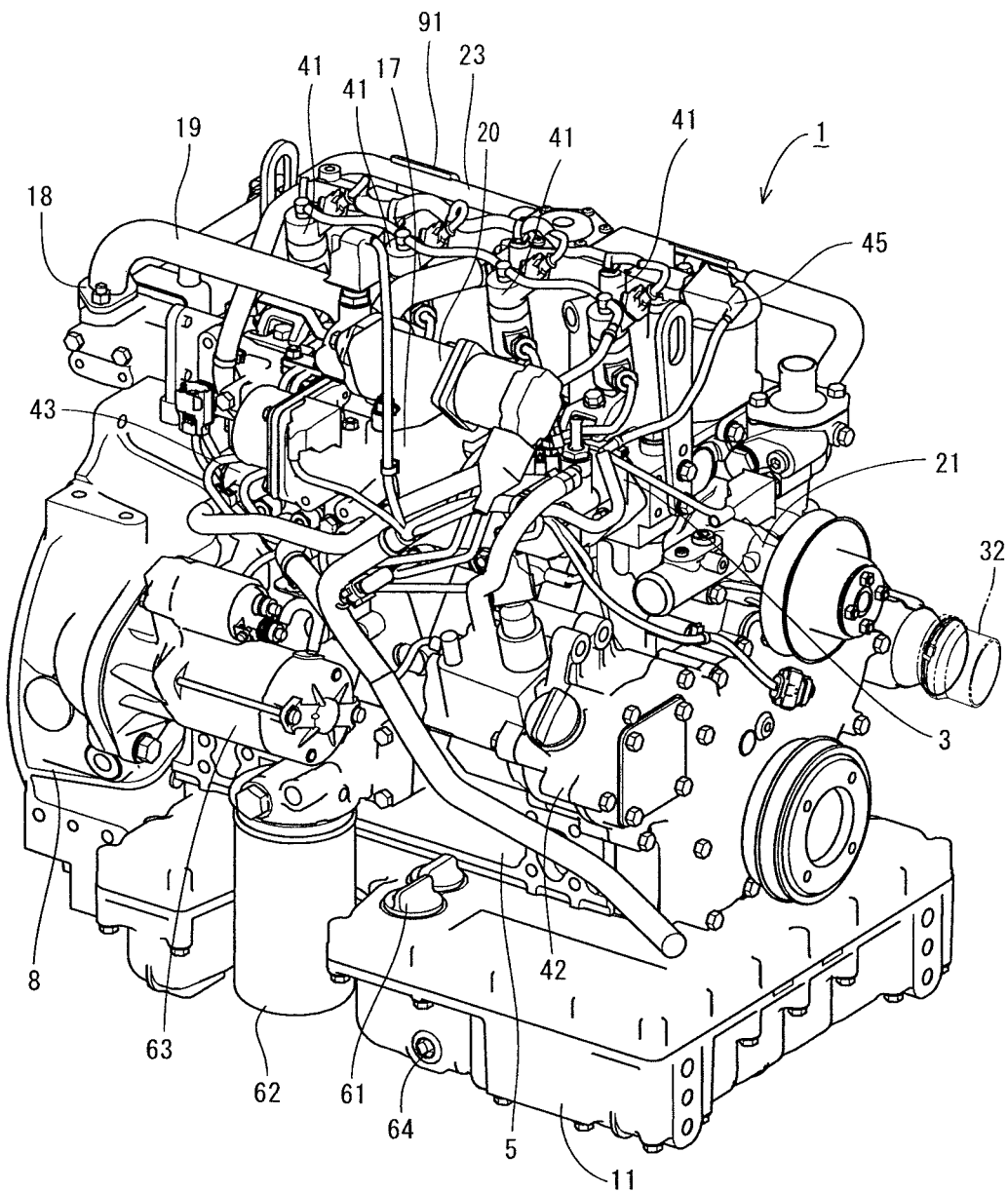
FIG. 11 is a right side perspective view from front side of the diesel engine (side on which the intake manifold is disposed).

As shown in FIGS. 9 and 10, the side face of the oil pan 11 protrudes outward from the side face of the cylinder block 5 among side faces of the diesel engine 1, and the exhaust gas purification device 31 is disposed adjacent to the side face of the cylinder block 5 and the top face of the oil pan 11. Therefore, exhaust gas purifying temperature of the exhaust gas purification device 31 can be easily maintained at a temperature necessary for purifying the exhaust gas or higher by thermal conduction from the cylinder block 5. In particular, exhaust gas purifying performance of the diesel engine 1 can be easily maintained even in a case where the diesel engine 1 is continuously operated for long period of time at low rotation speed (the intermediate rotation speed N #1 shown in FIG. 20) so that inside temperature of the cargo transportation container 52 is maintained to be constant.

As shown in FIGS. 9, 10, and 13 to 15, the first bracket 71 is disposed on the side face of the cylinder block 5 portion forming the diesel engine 1, the second bracket 72 is disposed on the side face portion of the oil pan 11, the above-mentioned support body is constituted of the second bracket 72, the exhaust gas purification device 31 is connected to the first bracket 71 and the second bracket 72, and the exhaust manifold 6 of the diesel engine 1 is connected to the exhaust gas purification device 31 via the expansion joint 36. Therefore, the exhaust gas purification device 31 can be easily assembled by two-point support with the first bracket 71 for fixing the side face and the second bracket 72 for fixing the bottom face.

Mounting position of the exhaust gas purification device 31 can be easily adjusted with respect to the exhaust manifold 6 disposed on the cylinder head 2 of the diesel engine 1. A mounting error of the exhaust gas purification device 31 can be absorbed by deformation of the expansion joint 36.

As shown in FIGS. 13 to 15, the first bracket 71 is fastened to at least one of the side face portions of the exhaust gas inlet side end portion and the exhaust gas outlet end portion in the side face portion of the exhaust gas purification device 31, while the second bracket 72 is fastened to the bottom face portion of the exhaust gas purification device 31. Therefore, among assembling positions of the exhaust gas purification device 31, an assembling position in the exhaust gas moving direction is restricted by the first bracket 71. Assembling position of the exhaust gas purification device 31 in the vertical direction is restricted by the second bracket 72. In other words, the exhaust gas purification device 31 can be easily attached and detached to the side face portion of the cylinder block 5 and the side face portion of the oil pan 11. Assembling workability of the exhaust gas purification device 31 can be improved.

Next, with reference to FIGS. 4, 7, 10, 12, and 17 to 19, the mounting structure of the exhaust gas recirculation device 15 and the EGR cooler 18 as the exhaust gas cooling means is described. As shown in FIGS. 9, 10, and 13 to 15, the exhaust gas recirculation device 15 is attached to the intake manifold 3 of the diesel engine 1, while the EGR cooler 18 (exhaust gas cooling means) for cooling the recirculated exhaust gas is disposed on the top face side of the flywheel housing 8 disposed on the diesel engine 1.

As shown in FIGS. 4, 7, 10, 12, and 17 to 19, a recirculation coupling 86 for communicating the exhaust gas recirculation device 15 and the EGR cooler 18 is fastened with bolts to a corner portion of the surface on which the intake manifold 3 is disposed and the surface on which the flywheel housing 8 is disposed (one side portion on the back of the cylinder head 2), among outer side faces of the diesel engine 1. The EGR cooler 18 is provided with the recirculating exhaust gas pipe 19 via the recirculation coupling 86 so that the exhaust gas of the EGR cooler 18 is supplied from the recirculation coupling 86 to the EGR valve 20 via the recirculating exhaust gas pipe 19.

In addition, in the structure in which the exhaust gas purification device 31 is attached to the exhaust manifold 6 of the diesel engine 1, the exhaust gas coupling 6*a* for communicating the exhaust manifold 6 to the EGR cooler 18 or the exhaust gas purification device 31 is disposed on a corner portion of the surface on which the exhaust manifold 6 is disposed and the surface on which the flywheel housing 8 is disposed (rear end portion of the exhaust manifold 6), among outer side faces of the diesel engine 1.

The exhaust gas inlet side end portion of the EGR cooler 18 is fastened to the exhaust gas coupling 6*a* with exhaust gas coupling bolts 87 that can be screwed from the side on which the intake manifold 3 is disposed (right side of the engine 1) or the side on which the flywheel housing 8 is disposed (rear side of the engine 1). The exhaust gas of the diesel engine 1 from the exhaust manifold 6 branches at the exhaust gas coupling 6*a*, so that the exhaust gas is sent from the exhaust gas coupling 6*a* to the EGR cooler 18 or the exhaust gas purification device 31.

Figure 17:
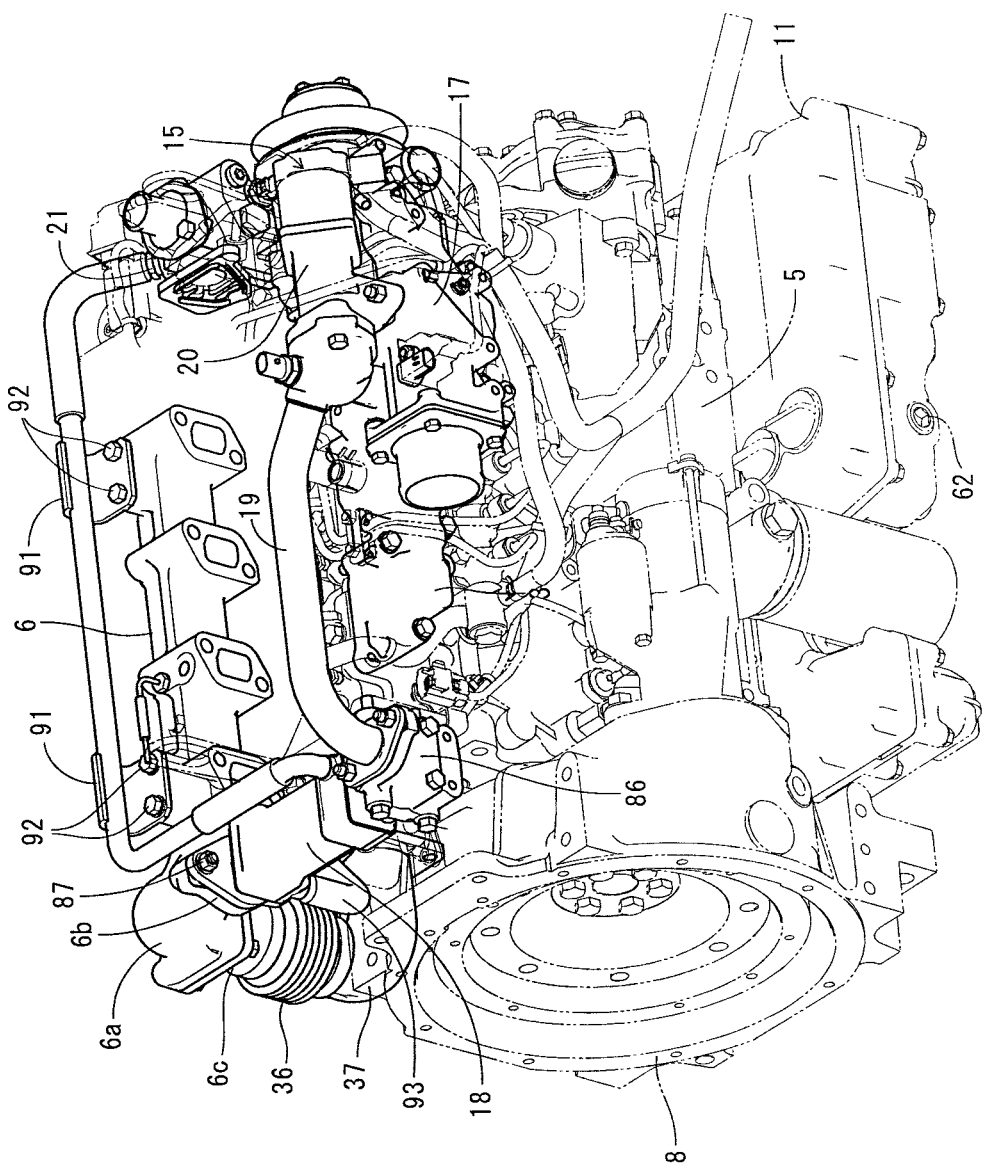
FIG. 17 is a perspective view of the exhaust gas recirculation device portion viewed from above.

Further, as shown in FIGS. 17 to 19, the cooling water pump 21 for circulating cooling water for the diesel engine 1 is disposed. The cooling water pump 21 and the EGR cooler 18 are disposed on each of the opposed side faces (front side face and rear side face) among side faces of the diesel engine 1. The cooling water pipe 23 is disposed for connecting the cooling water outlet of the cooling water pump 21 to the cooling water inlet of the EGR cooler 18. The intermediate portion of the cooling water pipe 23 extends on the top face side of the exhaust manifold 6 of the diesel engine 1.

In other words, one end of a plurality of cooling water pipe support plates 91 are welded and fixed to the cooling water pipe 23. Other ends of the cooling water pipe support plates 91 are fastened to the top face of the exhaust manifold 6 with bolts 92. The cooling water of the radiator (not shown) is supplied from the cooling water pipe 23 to the exhaust gas outlet portion of the EGR cooler 18, so that the exhaust gas from the EGR cooler 18 is cooled by the cooling water. Note that an outlet pipe 93 is connected to the exhaust gas inlet portion of the EGR cooler 18, and the cooling water is sent from the EGR cooler 18 to the cylinder block 5 via the outlet pipe 93, so as to cool the cylinder block 5 with the cooling water.

As shown in FIGS. 1, 4, 7, 10, and 12, in the engine device mounted in the container, in which the air conditioning unit (compressor 7) or the like mounted in the cargo transportation container 52 is driven by the diesel engine 1, the exhaust gas recirculation device 15 is attached to the intake manifold 3 of the diesel engine 1, while the flywheel housing 8 is disposed in the diesel engine 1. In this structure, the EGR cooler 18 as the exhaust gas cooling means for cooling the recirculation exhaust gas is disposed on the top face side of the flywheel housing 8. Therefore, the EGR cooler 18 can be compactly disposed utilizing a top face space of the flywheel housing 8. The EGR cooler 18 can be disposed without substantially increasing mounting width dimensions (height, right and left width, front and rear width) of the diesel engine 1. In other words, cargo load capacity of the container 52 can be easily secured, and at the same time, the diesel engine 1 can be compactly mounted in the container 52.

As shown in FIGS. 4, 7, 10, 12, and 17 to 19, the recirculating exhaust gas pipe 19 as the recirculation coupling for communicating the exhaust gas recirculation device 15 and the EGR cooler 18 is disposed at the corner portion of the surface on which the intake manifold 3 is disposed and the surface on which the flywheel housing 8 is disposed, among outer side faces of the diesel engine 1. Therefore, the exhaust gas recirculation device 15 and the EGR cooler 18 can be compactly disposed utilizing the face of the diesel engine 1 on which the intake manifold 3 is disposed and the surface on which the flywheel housing 8 is disposed. At the same time, the exhaust gas can be moved with little resistance from the EGR cooler 18 to the exhaust gas recirculation device 15. Without increasing load of the diesel engine 1, nitrogen oxide in the exhaust gas can be reduced, and thus the exhaust gas purifying function can be improved.

In addition, in the structure in which the exhaust gas purification device 31 is attached to the exhaust manifold 6 of the diesel engine 1, the exhaust gas coupling 6*a* for communicating the exhaust manifold 6 to the EGR cooler 18 or the exhaust gas purification device 31 is disposed at the corner portion of the surface on which the exhaust manifold 6 is disposed and the surface on which the flywheel housing 8 is disposed, among outer side faces of the diesel engine 1. Therefore, the EGR cooler 18 and the exhaust gas purification device 31 can be compactly disposed utilizing the face of the diesel engine 1 on which the exhaust manifold 6 is disposed and the surface on which the flywheel housing 8 is disposed. At the same time, the exhaust gas can be moved with little resistance from the exhaust manifold 6 to the EGR cooler 18 and the exhaust gas purification device 31. Without increasing load of the diesel engine 1, the exhaust gas purifying function can be improved.

As shown in FIGS. 14 and 17, the exhaust gas inlet side end portion of the EGR cooler 18 is fastened to the exhaust gas coupling 6*a* with the exhaust gas coupling bolts 87 that can be screwed from the side on which the intake manifold 3 is disposed or the side on which the flywheel housing 8 is disposed. Therefore, both the exhaust gas recirculation device 15 and the EGR cooler 18 can be attached and detached from the same side of the diesel engine 1 (the side on which the intake manifold 3 is disposed or the side on which the flywheel housing 8 is disposed). Thus, assembling workability or maintenance workability of the EGR cooler 18 can be improved.

As shown in FIGS. 4, 7, 10, 12, and 17 to 19, the exhaust gas coupling 6*a* for communicating the EGR cooler 18 to the exhaust manifold 6 of the diesel engine 1 is disposed at the corner portion of the surface on which the exhaust manifold 6 is disposed and the surface on which the flywheel housing 8 is disposed, among outer side faces of the diesel engine 1, so that the EGR cooler 18 can be fastened to the exhaust gas coupling 6*a* from the side on which the intake manifold 3 is disposed via the top face side or the bottom face side of the EGR cooler 18. Therefore, without opening the side face of the engine room 56 on the side on which the flywheel housing 8 is disposed, the EGR cooler 18 can be attached and detached to the exhaust gas coupling 6*a*. Thus, assembling workability and maintenance check workability of the EGR cooler 18 and the exhaust gas recirculation device constituted of the EGR cooler 18 can be improved.

As shown in FIGS. 17 to 19, in the structure including the cooling water pump 21 for circulating the cooling water for the diesel engine 1, the cooling water pump 21 and the EGR cooler 18 are disposed on each of the opposed side faces among side faces of the diesel engine 1, the cooling water pipe 23 for connecting the cooling water inlet of the EGR cooler 18 to the cooling water outlet of the cooling water pump 21 is disposed, and the intermediate portion of the cooling water pipe 23 extends on the top face side of the exhaust manifold 6 of the diesel engine 1. Therefore, the cooling water pipe 23 can be compactly assembled at a place where maintenance check work of each portion of the diesel engine 1 is not blocked, utilizing the exhaust manifold 6 having high rigidity. Because the cooling water pipe 23 is supported on the side face of the engine 1 opposite to the side for maintenance check work of each portion of the diesel engine 1, it is possible to prevent damage to the cooling water pipe 23 due to abutting of a tool or the like when maintenance check of each portion of the diesel engine 1 is performed.

Next, with reference to FIGS. 21 to 25, a structure of the oil pan 11 of the diesel engine 1 of the first embodiment shown in FIGS. 1 to 19 is described. As shown in FIGS. 21 to 25, the oil pan 11 is constituted of an upper oil pan 111 and a lower oil pan 112 that are vertically combined. Note that the upper oil pan 111 and the lower oil pan 112 are detachably united to be a rectangular box shape with a packing (not shown) made of rubber, synthetic resin, or the like.

As shown in FIGS. 21 to 25, a cylinder block mounting seat 113 having a closed curve shape as an engine mounting seat is formed on a top face of the upper oil pan 111. The cylinder block mounting seat 113 contacts with the bottom face of the cylinder block 5 via a packing 114, and the cylinder block mounting seat 113 is fastened to the cylinder block 5 with nineteen short bolts 115 and nine long bolts 116. The nineteen short bolts 115 penetrate from the bottom face side to the top face side of the upper oil pan 111. In other words, the nineteen short bolts 115 fasten only the upper oil pan 111 to the cylinder block 5. On the other hand, the nine long bolts 116 penetrate from the bottom face side of the lower oil pan 112 to the top face side of the upper oil pan 111. In other words, the nine long bolts 116 fasten both the upper oil pan 111 and the lower oil pan 112 to the cylinder block 5S. The nine long bolts 116 and the boss portions of the upper oil pan 111 and the lower oil pan 112 through which the long bolts 116 penetrate support vertical load from the cylinder block 5 so that the rigidity can be increased and the number of the fastening bolts can be reduced.

On a part of the top face of the upper oil pan 111, which is surrounded by the cylinder block mounting seat 113, four oil receiving openings 118 of the same number as that of the cylinders of the four-cylinder diesel engine 1 are formed in a row via bridge-like connecting walls 117, and hence each oil receiving opening 118 is disposed to be opposed to the bottom face of the cylinder block 5. Engine oil dropping downward from each of the four cylinders of the cylinder block 5 enters inside of the oil pan 11 through each oil receiving opening 118. Note that a housing attachment surface 119 is formed on one side face of the upper oil pan 111, the flywheel housing 8 is fastened with bolts to the housing attachment surface 119, the top face of the upper oil pan 111 is fastened with bolts to the cylinder block 5, the one side face of the upper oil pan 111 is fastened with bolts to the flywheel housing 8, and hence mounting rigidity of the diesel engine 1 and the oil pan 11 is improved.

In addition, a drain hole 121 for draining oil in the oil pan 11 is formed in one side face of the lower oil pan 112 among side faces adjacent to the one side face of the upper oil pan 111 on which the housing attachment surface 119 is formed. The drain hole 121 is closed by a drain cap 122 in an openable and closable manner. In addition, an oil filter attachment recess 123 is formed in a part adjacent to the drain hole 121 in one of side faces of the upper oil pan 111 and the lower oil pan 112, and the lower side of the engine oil filter 62 is disposed in the oil filter attachment recess 123.

On the other hand, in the top face of the upper oil pan 111, the oil supply lid 61 for engine oil provided with an oil gage 124 is fixed to the top face above the drain hole 121 in an openable and closable manner. Further, a support body attachment surface 127 as a support body attaching portion is formed on a side face opposed to the side face on which the drain hole 121 and the like are formed, among side faces of the lower oil pan 112. In other words, the support body attachment surface 127 is formed on the side face of the upper oil pan 111 protruding outward from the side face of the cylinder block 5 among side faces of the diesel engine 1. The second bracket 72 is fastened with the bolts 83 to the support body attachment surface 127 in an attachable and detachable manner, and the reception frame 82 on the bottom face side of the DPF case 33 is connected to the upper oil pan 111 via the second bracket 72.

Figure 21:
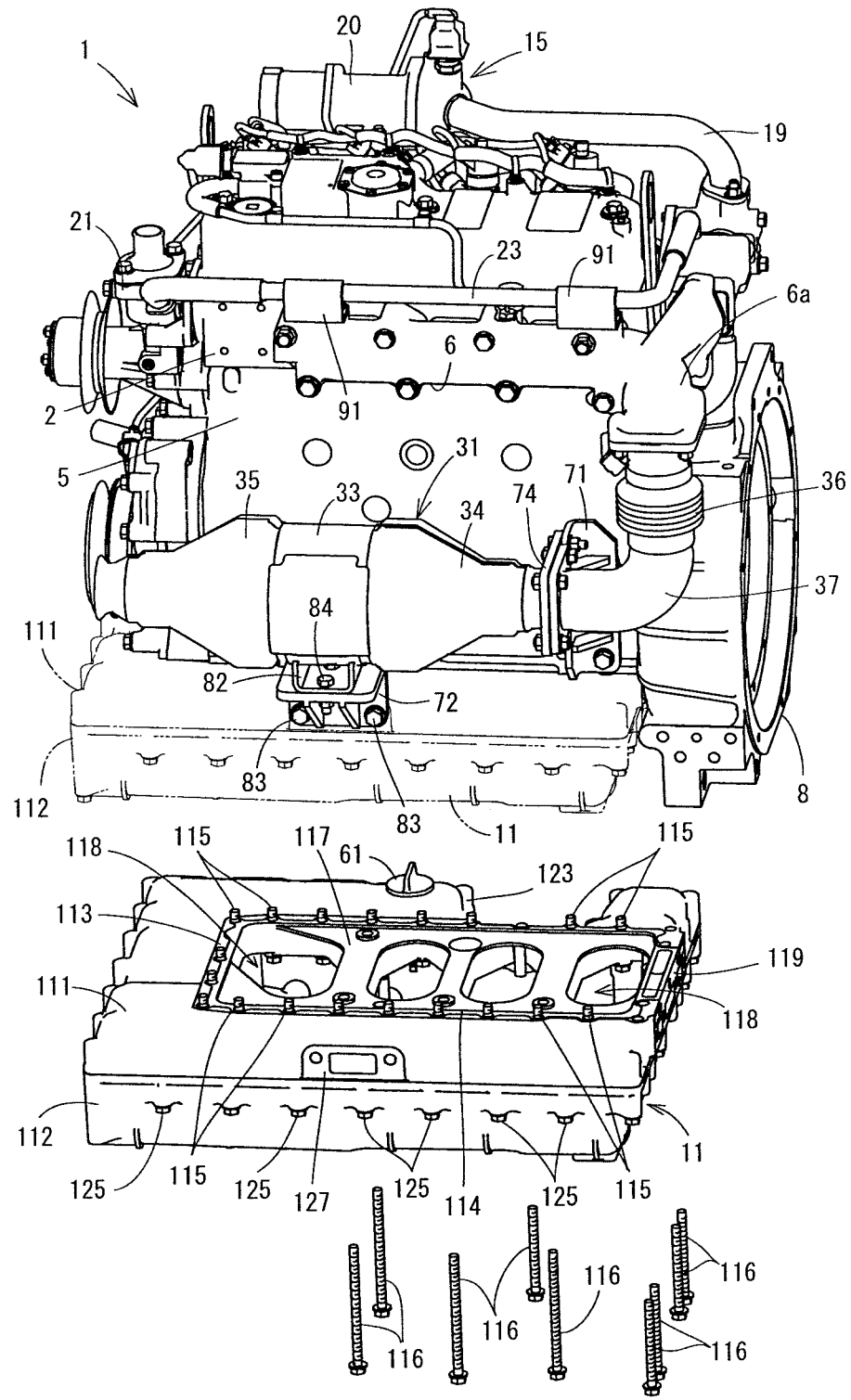
FIG. 21 is an exploded view of the diesel engine and the oil pan.
Figure 22:
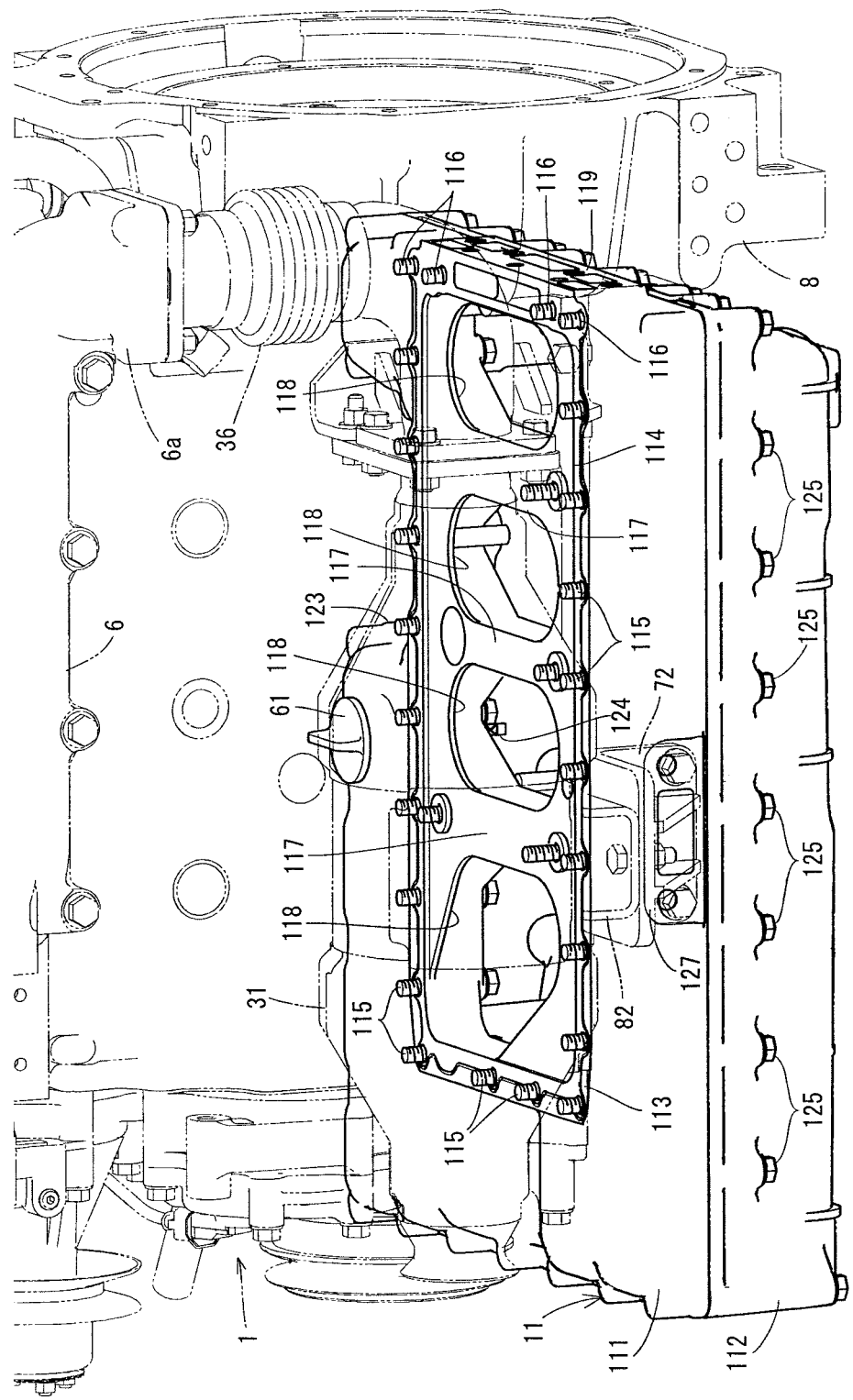
FIG. 22 is a left side perspective view of the oil pan.
Figure 23:
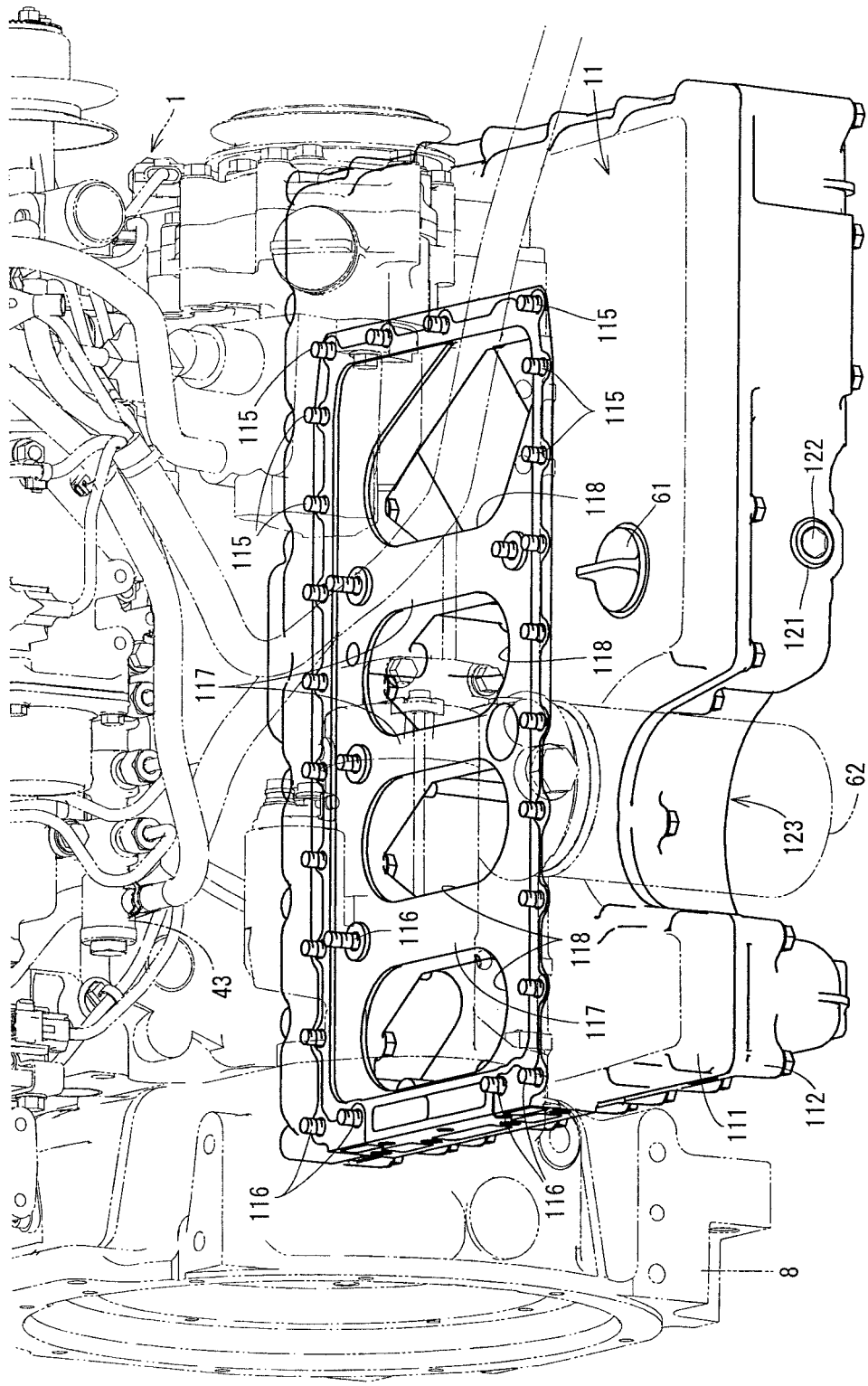
FIG. 23 is a right side perspective view of the oil pan.
Figure 26:
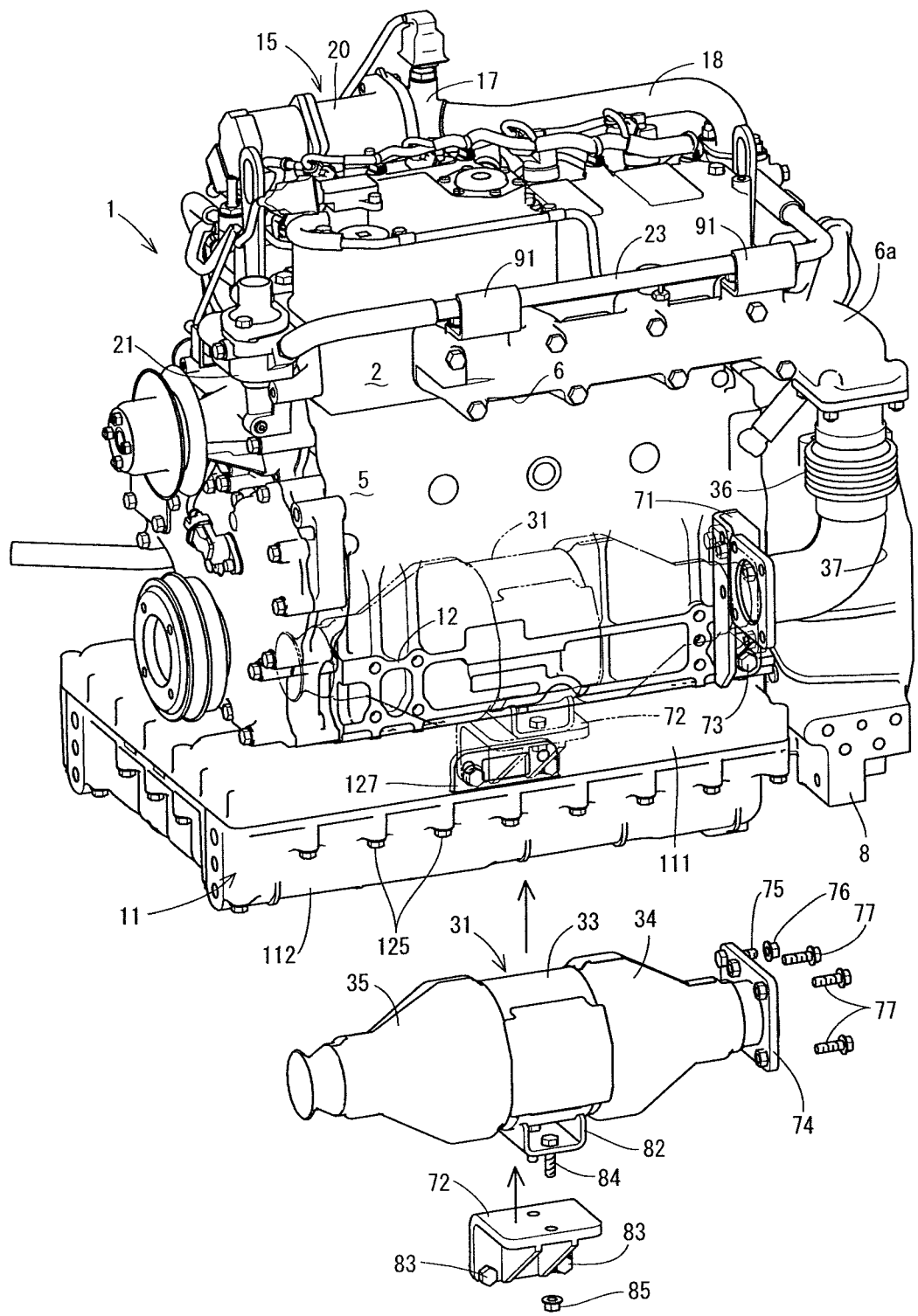
FIG. 26 is an exploded view of the diesel engine and the exhaust gas purification device.

As shown in FIGS. 21 and 26, the exhaust gas purification device 31 is disposed to face the side face on which the engine leg mounting portion 12 is formed among side faces of the cylinder block 5. In other words, the engine leg mounting portion 12 is formed on the side face of the cylinder block 5, an engine leg (not shown) is fixed to the engine leg mounting portion 12, and the diesel engine 1 is supported by the frame of the engine room 56 in vibration isolation via the engine leg. In addition, the support body attachment surface 127 is formed on the side face of the upper oil pan 111 corresponding to the side face of the cylinder block 5 on which the engine leg mounting portion 12 is formed. The exhaust gas purification device 31 is supported adjacent to the engine leg of the diesel engine 1 fastened to the engine leg mounting portion 12.

In addition, the oil filter attachment recess 123 is formed on one side portion of the oil pan 11 in which the drain hole 121 is formed, and the second bracket 72 is disposed on the other side portion of the oil pan 11. On the other hand, the second bracket 72 and the oil gage 124 are disposed on each of both sides of the oil pan 11 with respect to the cylinder block 5, the engine oil filter 62 and the oil gage 124 are disposed to be adjacent to each other, and hence workability of maintenance such as exchanging the filter 62 or checking the oil gage 124 is improved.

In addition, a fitting surface of the bottom face of the upper oil pan 111 is bonded to a fitting surface of the top face of the lower oil pan 112 via a packing (not shown), a plurality of connecting bolts 125 penetrate the lower oil pan 112 from a bottom face side of the lower oil pan 112, and hence each connecting bolt 125 engages with the upper oil pan 111. In other words, the lower oil pan 112 is fastened with bolts 125 to the upper oil pan 111 in the state where the upper oil pan 111 is fastened to the cylinder block 5, and thus the diesel engine 1 and the oil pan 11 are integrally united.

Figure 24:
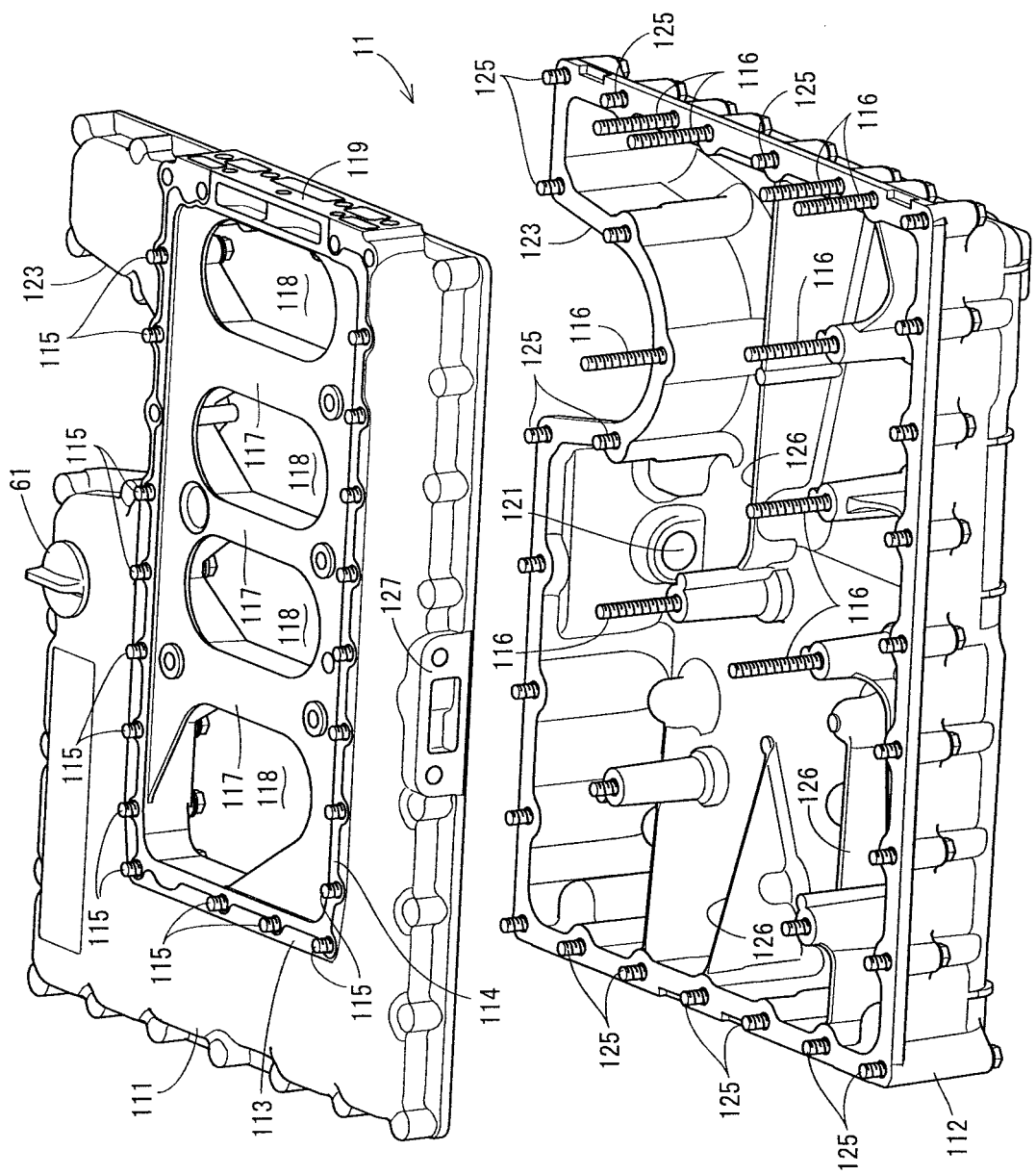
FIG. 24 is a perspective view of the exploded oil pan viewed from above.
Figure 25:
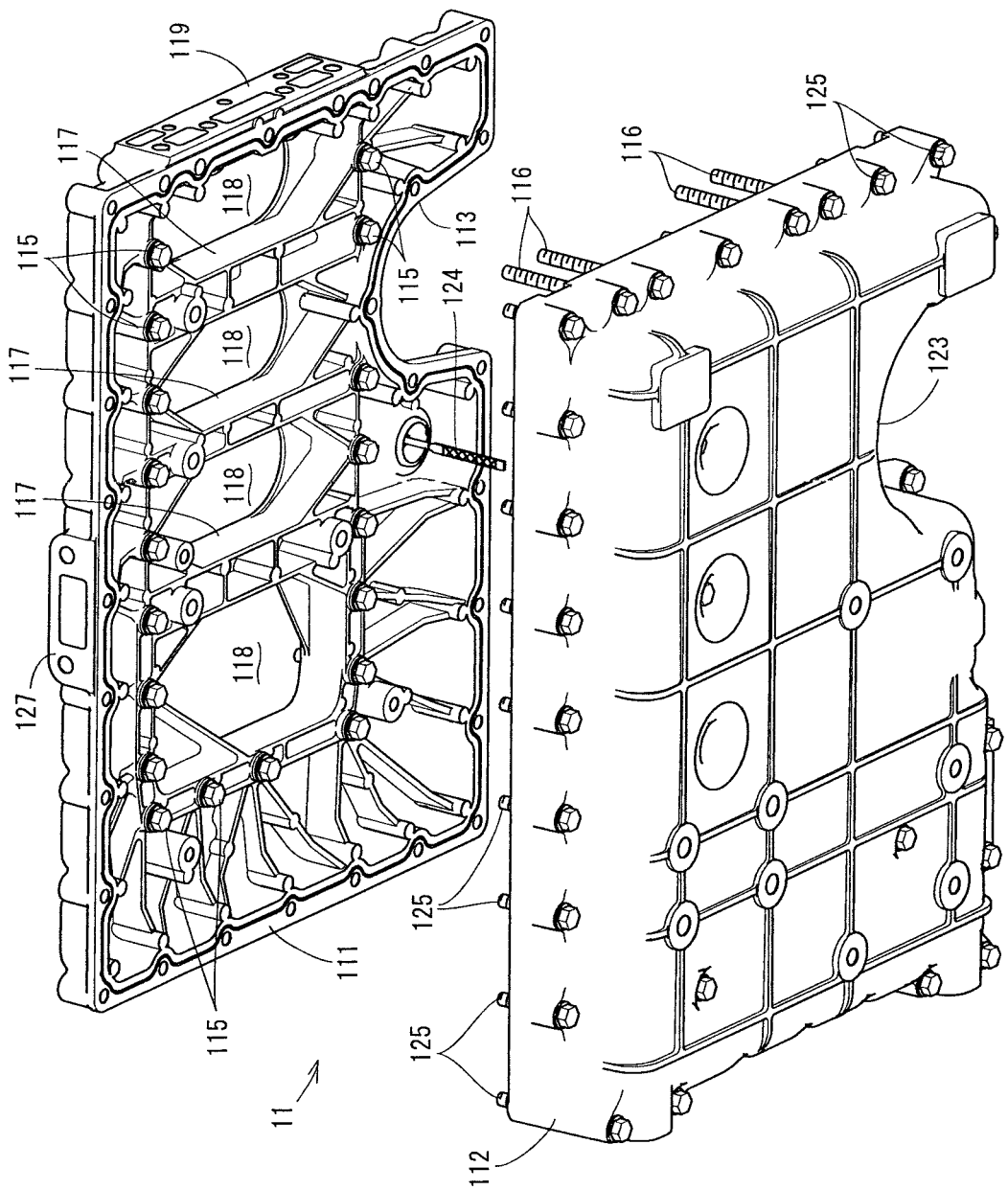
FIG. 25 is a perspective view of the exploded oil pan viewed from below.

On the other hand, as shown in FIG. 24, a plurality of stiffening ribs 126 are formed to protrude from the bottom face inside the lower oil pan 112 having a rectangular box shape with an opened top face. The plurality of stiffening ribs 126 are formed to have a triangular shape in a side view like a tilted vertical plate in a side view. Note that a suction filter 128 shown in FIG. 15 is disposed near the center of the lower oil pan 112, the shape in a side view of each of the stiffening ribs 126 is a triangular shape having an acute angle at the inside edge, and the inside edge of each stiffening rib 126 is tilted toward the drain hole 121. Therefore, the height of the inside edge of reach stiffening rib 126 is decreased so that interference with the suction filter can be prevented. In addition, the bottom face of the lower oil pan 112 is tilted downward to the side of the bored drain hole 121. Therefore, the engine oil on the bottom face of the lower oil pan 112 does not accumulate between the stiffening rib 126 and the side face of the lower oil pan 112 but flows along the stiffening rib 126 to the side of the bored drain hole 121. As a result, even if the engine 1 and the oil pan 11 are disposed in the horizontal direction, or even if they are tilted downward a little in the direction opposite to the side where the drain hole 121 is formed, the engine oil on the bottom face of the oil pan 11 flows to the side where the drain hole 121 is formed. Therefore, when the drain cap 122 is removed from the drain hole 121, the engine oil in the oil pan 11 can be quickly drained.

As shown in FIGS. 21 to 25, in the structure in which the oil pan 11 is constituted of the upper oil pan 111 and the lower oil pan 112 divided vertically, the stiffening rib 126 is formed on the bottom of the lower oil pan 112 like the vertical plate tilted to the drain hole 121 in a side view, the oil filter attachment recess 123 is formed on the one side portion of the oil pan 11 on which the drain hole 121 is formed, and the second bracket (support body) 72 is disposed on the other side portion of the oil pan 11. Therefore, the opposed side portions of the oil pan 11 protrude from both sides of the bottom of the diesel engine 1 so that the mounting spaces for the exhaust gas purification device 31 and the oil filter 62 can be secured, and molding cost of the oil pan 11 having a large capacity can be reduced. At the same time, sufficient rigidity of the oil pan 11 and the like can be secured, and hence it is possible to form a balanced structure in which vibration of the diesel engine 1 is hardly transmitted.

As shown in FIGS. 21 to 25, the oil receiving openings 118 of the same number as that of the cylinders of the diesel engine 1 are formed on the cylinder block mounting seat (engine mounting seat) 113 on the top face of the upper oil pan 111, and each of the oil receiving openings 118 is disposed to face the bottom face of the cylinder block 5 of the diesel engine 1. The oil gage 124 is disposed on the top face above the drain hole 121 in the top face of the upper oil pan 111, the second bracket (support body) 72 and the oil gage 124 are disposed on each of both sides of the oil pan 11 with respect to the cylinder block 5. Therefore, the oil gage 124, the oil filter 62, and the like of a high maintenance frequency can be supported on one side of the diesel engine 1. In addition, the exhaust gas purification device 31 can be supported on the other side of the diesel engine 1 away from the place of the maintenance. Thus, it is possible to easily prevent a worker checking or exchanging the oil gage 124 or the oil filter 62 from contacting with the exhaust gas purification device 31 that tends to be a high temperature.

As shown in FIGS. 3, 5 to 7, 9, 10, and 15, in the engine device, in which the exhaust gas recirculation device 15 and the common rail 43 are disposed on the side of the diesel engine 1 on which the intake manifold 3 is disposed, the exhaust gas purification device 31 is disposed on the side of the diesel engine 1 on which the exhaust manifold 6 is disposed, and the oil pan 11 is disposed on the bottom of the diesel engine 1, the second bracket 72 is provided as the support body for linking the exhaust gas purification device 31 to the oil pan 11, so that the exhaust gas purification device 31 is supported by the oil pan 11 via the second bracket 72. Therefore, the exhaust gas purification device 31 can be assembled adjacent to the diesel engine 1 in high rigidity utilizing the large oil pan 11 having a high-rigidity structure due to casting process, for example. In addition, without substantially increasing mounting width dimensions (height, right and left width, front and rear width) of the diesel engine 1, the large oil pan 11 and the exhaust gas purification device 31 can be compactly disposed. In other words, the diesel engine 1 can be compactly mounted in the freezing shipping container 52 or the like, for example.

As shown in FIGS. 21 to 25, the oil pan 11 has the vertically divided structure including the upper oil pan 111 and the lower oil pan 112. In this structure, the support body attachment surface 127 (support body attaching portion) is formed on the side face of the upper oil pan 111 protruding outward from the side face of the cylinder block 5 among side faces of the diesel engine 1, and the second bracket 72 is detachably fastened to the support body attachment surface 127. Therefore, the mounting space for the exhaust gas purification device 31 can be secured by the protruding side portion of the oil pan 11 from the side of the bottom portion of the diesel engine 1. By utilizing the oil pan 11 having large capacity enabling continuous operation of the diesel engine 1 for long period of time, it is possible to simplify the support structure for the exhaust gas purification device 31. At the same time, sufficient support rigidity of the exhaust gas purification device 31 can be secured.

As shown in FIGS. 1 and 5, the fuel filter 44 is disposed on the side of the machine frame 58 on which the diesel engine 1 is disposed, and the fuel filter 44 is connected to the fuel pump 42 of the diesel engine 1. Therefore, the fuel filter 44 can be assembled to the place facilitating maintenance work, and inconvenience that mounting width dimensions (height, right and left width, front and rear width) and the like of the diesel engine 1 are restricted by the fuel filter 44 can be eliminated, and the diesel engine 1 can be compactly mounted in various machines.

As shown in FIGS. 21 and 26, the exhaust gas purification device 31 is disposed to face the side face on which the engine leg mounting portion 12 is formed among side faces of the cylinder block 5. Therefore, the exhaust gas purification device 31 can be supported adjacent to the engine leg (not shown) of the diesel engine 1 fastened to the engine leg mounting portion 12. Vibration load of the exhaust gas purification device 31 that affects the engine leg can be reduced. For instance, compared with a structure in which the exhaust gas purification device 31 is supported away from the engine leg, the vibration load of the exhaust gas purification device 31 affecting the engine leg can be reduced. Because the shaking and vibration of the exhaust gas purification device 31 due to vibration of the diesel engine 1 is suppressed so that a load of the engine leg necessary for supporting the exhaust gas purification device 31 can be reduced, antivibration mounting structure of the diesel engine 1 can be simplified.

EXPLANATION OF NUMERALS

1 diesel engine
3 intake manifold
5 cylinder block
6 exhaust manifold
11 oil pan
12 engine leg mounting portion
15 exhaust gas recirculation device
31 exhaust gas purification device
42 fuel pump
43 common rail
44 fuel filter
58 machine frame
72 second bracket (support body)
111 upper oil pan
112 lower oil pan
127 support body attachment surface (support body attaching portion)

The invention claimed is:

1. An engine device comprising:
   an exhaust gas recirculation device and a common rail, which are disposed on a side on which an intake manifold of an engine is disposed;
   an exhaust gas purification device disposed on a side on which an exhaust manifold of the engine is disposed;
   an oil pan disposed on a bottom of the engine; and
   a support body for linking the exhaust gas purification device to the oil pan, so that the exhaust gas purification device is supported by the oil pan via the support body,
   wherein the oil pan is configured to be divided into an upper oil pan and a lower oil pan, a support body attaching portion is formed on a side face of the upper oil pan protruding outward from a side face of a cylinder block among side faces of the engine, and the support body is detachably fastened to the support body attaching portion.

2. The engine device according to claim 1, wherein a fuel filter is disposed on a machine frame side on which the engine is installed, and the fuel filter is connected to a fuel pump of the engine.

3. The engine device according to claim 1, wherein the exhaust gas purification device is disposed to face a side face on which an engine leg mounting portion is formed among side faces of the cylinder block.

* * * * *